United States Patent [19]

Varsanyi et al.

[11] 3,912,518
[45] Oct. 14, 1975

[54] 2-GUANIDINO-4,6-BIS-AMINO-S-TRIAZINES

[75] Inventors: Denis Varsanyi, Arlesheim; Willy Roth, Aargau, both of Switzerland

[73] Assignee: Ciba-Geigy Corporation, Ardsley, N.Y.

[22] Filed: Mar. 14, 1973

[21] Appl. No.: 341,016

Related U.S. Application Data

[60] Division of Ser. No. 118,153, Feb. 23, 1971, Pat. No. 3,734,909, which is a continuation-in-part of Ser. No. 672,743, Oct. 4, 1967, abandoned.

[30] Foreign Application Priority Data

Oct. 27, 1966 Switzerland.................. 15990/66

[52] U.S. Cl. .................... 106/3; 106/5; 106/6; 106/8; 106/10; 106/11; 106/173 R; 106/191; 106/218; 106/229; 106/230; 106/231; 106/270; 106/271; 260/28; 260/28.5

[51] Int. Cl.$^2$ .. C09G 1/00; C09G 1/04; C09G 1/08; C09G 1/10

[58] Field of Search .............. 106/3–10, 270–272, 106/173 R, 191, 218, 229, 230, 231; 260/249.6, 28, 28.5

[56] References Cited

UNITED STATES PATENTS

| | | | |
|---|---|---|---|
| 3,053,843 | 9/1962 | Gysin et al. ............... | 260/249.6 X |
| 3,097,911 | 7/1963 | Moll............................ | 260/249.6 X |
| 3,206,407 | 9/1965 | Lutwack ..................... | 260/249.6 X |
| 3,290,307 | 12/1966 | Keller et al. .................. | 260/249.6 |
| 3,301,823 | 1/1967 | Gehm et al. .................. | 260/249.6 X |
| 3,321,452 | 5/1967 | Breslow ....................... | 260/249.6 X |
| 3,322,763 | 5/1967 | Dazzi et al. ................... | 260/249.6 X |
| 3,419,556 | 12/1968 | Schubert et al. .............. | 260/249.6 |
| 3,526,622 | 9/1970 | Varsanyi et al. .............. | 260/249.6 X |
| 3,734,909 | 5/1973 | Varsanyi et al. .............. | 260/249.6 |

FOREIGN PATENTS OR APPLICATIONS

922,830    4/1963    United Kingdom.................... 106/3

*Primary Examiner*—Joan E. Welcome
*Attorney, Agent, or Firm*—Frederick H. Rabin

[57] ABSTRACT

Novel 2-guanidino-4,6-bis-amino-s-triazine derivatives as well as quaternary and acid addition salts thereof and salts of certain of the novel s-triazines in which the latter constitute the anion are described, which contain, per molecule, two 2-quanidino-4-amino-s-traizine moieties linked with each other via different nitrogen atoms of a polybasic amine and which have wax-like properties and are useful as components in surface treating agents, especially in combination with conventional ingredients in compositions for the treatment of floor surfaces, such as natural and synthetic waxes, resins, silicones, inorganic and organic fillers, detergents and other surfactants, pigments, stabilizing agents and the like conventional adjuvants; the aforesaid novel s-triazine derivatives afford to the treated surfaces, among other advantages, high gloss and at the same time satisfactory antislip effects. They are also useful as textile softeners.

7 Claims, No Drawings

2-GUANIDINO-4,6-BIS-AMINO-S-TRIAZINES

This is a division of application Ser. No. 118,153, filed on Feb. 23 1971 now U.S. Pat. No. 3,734,909 which in turn was a continuation-in-part of application Ser. No. 672,743, filed on Oct. 4, 1967, now abandoned.

DESCRIPTION OF THE INVENTION

The present invention relates to certain novel 2-guanidino-4,6-bis-amino-s-triazine derivatives and to floor-care agents containing them as wax-like components which serve particularly to impart high gloss and antislip effects to surfaces treated therewith.

By the term "floor-care agent" as used in the following description of the invention, there are meant compositions which are useful for the treatment of floor surfaces of all types to clean the same and impart to them gloss and, preferably, at the same time, an antislip effect. Such surfaces can be those of inorganic materials such as stone, tile, metal articles, etc., or they can be surfaces of organic materials such as wood, leather, synthetic plastics, e.g. linoleum; textile fiber materials and paper can also be treated with the agents according to the invention and similar beneficial results are obtained.

We have found that triazine derivatives which contain two 2-guanidino-4-amino-s-triazinyl-(6) groups bound to different nitrogen atoms of a polybasic amine, have wax-like properties and, therefore, are valuable as wax components of floor care agents as described above.

More in particular, the novel guanidino triazine derivatives are of the formula

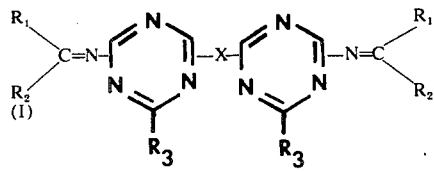

wherein
R$_1$R$_2$ and R$_3$ independently of each other each represent an amino group substituted by one or two organic radicals, or an unsubstituted or substituted, saturated 3- to 7-membered nitrogen heterocycle which can contain further hetero atoms, which heterocycle is bound by way of a ring nitrogen atom, and X represents a divalent radical of a polybasic amine or of an at least di-basic nitrogen heterocycle, which radical is bound to the two triazine rings by two different nitrogen atoms.

The organic radicals preset as substituents of amino groups represented by R$_1$, R$_2$ and R$_3$ are aliphatic, cyclo-aliphatic, aromatic, araliphatic or heterocyclically substituted aliphatic radicals, preferably, lower, aliphatic radicals; particularly such aliphatic radicals are straight-chain or branched alkyl or alkenyl radicals having 1 to 22 carbon atoms. The aliphatic substituent of a secondary amino group is, preferably, one having 6 to 22 and, more preferably, 10 to 22, carbon atoms, while, in the case of the two radicals of a teriary amino group, the one is preferably an alkyl or alkenyl radical having 1 to 6 carbon atoms and the other is one containing 6 to 22, and more preferably 10 to 22 carbon atoms. These alkyl and alkenyl radicals can be unsubstituted or mono- or polysubstituted. Suitable saturated nitrogen heterocyclic radicals bound by way of a ring nitrogn atom to the s-triazine nucleus are, preferably, 5- to 7- membered rings which in addition to nitrogen, can also contain as ring members other hetero atoms such as oxygen and/or sulfur. Examples thereof are pyrrolidino, piperidino, piperazino, 4-alkylpiperazino, morpholino, thiomorpholino as well as hexahydroazepino and -diazepino groups. These heterocyclic groups can be unsubstituted or mono- or polysubstituted, e.g. by alkyl or halogenoalkyl. The total number of carbon atoms in all of these amino substituents taken together is preferably not less than 20.

Examples of radicals of polybasic amines which form the bridging member X are the radicals of aliphatic polyamines such as ethylenediamine, hexamethylenediamine, N,N-bis-(α-aminopropyl)-N-methylamine, the radicals of aromatic polyamines such as phenylenediamine, diaminodiphenyl alkanes, the radicals of heterocyclic polyamines such as 2,6-diaminopyridine, as well as radicals of at least di-basic hydrogenated nitrogen heterocycles such as the radical of piperazine.

Compounds falling under Formula I which are of particular importance because of their ready accessibility and their good surface protecting and gloss-imparting properties are the 2-guanidino-4,6-bis-amino-s-triazine derivatives of the formula

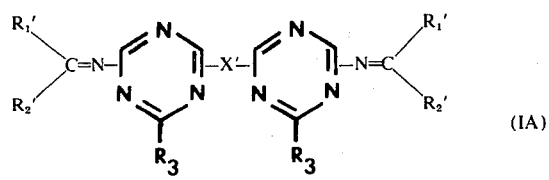

wherein
X' represents one of the following divalent bridging members:
  a. — NR — Y — NR —
wherein
Y represents alkylene of from 2 to 6 carbon atoms; alkenylene of from 3 to 6 carbon atoms; cycloalkylene-alkylene wherein the cycloalkylene moiety has from 5 to 8 and the alkylene moiety from 1 to 4 carbon atoms; alkylene-cycloalkylene-alkylene wherein the cycloalkylene moiety has from 5 to 8 carbon atoms and each alkylene moiety has from 1 to 4 carbon atoms, the total number of carbon atoms of the entire bridge member not exceeding 12;
  b. — NR — (alkylene-NR)$_n$alkylene—NR—
wherein each "alkylene" has from 2 to 6 carbon atoms, and
n represents an integer ranging from 0 to 4;
  c. — NR — phenylene — NR —
  d. — NR — phenylene -alkylene — NR —
wherein the alkylene moiety has at most 4 carbon atoms;
  e. — NR — alkylene - phenylene - alkylene-NR—
wherein each alkylene moiety has at most 4 carbon atoms;

R in each of the foregoing bridging members representing hydrogen or alkyl of at most 4 carbon atoms; or f. a divalent heterocyclic radical of the formula

which consists, apart from the two nitrogen atoms, of from 3 to 5 methylene groups as ring members, said methylene groups being unsubstituted or substituted by alkyl of at most 4 carbon atoms; or g. a divalent heterocyclic radical of the formula

which consists, apart from the nitrogen atom, and the group

of from 3 to 5 methylene groups as ring members, said methylene group being unsubstituted or substituted by alkyl of at most 4 carbon atoms, and R having the same meaning as above:
any substituent of the aforesaid cycloalkylene, aromatic and heterocyclic moieties and bridge members being an alkyl group of at most 4 carbon atoms;
each of $R_1'$, $R_2'$ and $R_3'$ represents a mono- or di-substituted amino group, the substitution of which is selected from alkyl of from 1 to 22 carbon atoms, and alkenyl of from 1 to 22 carbon atoms, at least one of the aforesaid amino substituents in $R_1'$, $R_2'$ or $R_3'$ being a long chain aliphatic radical as defined above having from 6 to 22 carbon atoms; pyrrolidino; piperidino; piperazino; 4-lower alkyl-piperazino; morpholino; thiomorpholino; hexahydroazepino or hexahydrodiazepino.

The term "lower" in connection with alkyl means that the latter has not more than 6 carbon atoms, and preferably not more than 4.

The new triazine derivatives of Formula I are produced according to the invention by reacting two equivalents of a 2-guanidino-4-amino-s-triazine of the formula

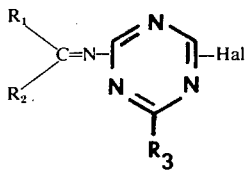

(II)

wherein
Hal represents a halogen atom up to the atomic number 35, and
$R_1$, $R_2$ and $R_3$ independently of each other, each represent an amino group substituted by one or two organic radicals or an unsubstituted or substituted, saturated 3- to 7-membered nitrogen heterocyclic group which can contain further hetero atoms, which heterocyclic group is bound by way of a ring nitrogen atom,
with one equivalent of a polybasic amine or with an at least di-basic, nitrogen-containing heterocyclic compound, the reaction being performed in the presence of a acid binding agent at temperatures between 100° and 300°C, optionally in the presence of a solvent or diluent.

Higher boiling organic solvents the boiling point of which is higher than 100°C are meant, in particular, by solvents or diluents. Examples thereof are aliphatic and aromatic hydrocarbons such as higher boiling petroleum fractions, toluene, xylenes; halogenated hydrocarbons such as chlorobenzene, higher boiling ethers, N-alkylated acid amides, sulphoxides, etc.

Both inorganic bases such as carbonates and hydroxides of alkali and alkaline earth metals as well as organic bases such as tertiary amines, e.g. pyridine and collidine, can be used according to the invention as acid biding agents. In some cases it is preferable to use, as solvent or diluent, a tertiary amine, e.g. pyridine, which has the simultaneous function of a solvent and an acid binding agent.

The new triazine derivatives of Formula I have characteristic melting ranges and have wax-like properties; they can be used, therefore, instead of or together with the usual commercial natural or synthetic waxes for the treatment and protection of surfaces of all types. They have the characteristic properties of natural waxes such as solubility in solvents for fat, miscibility with natural and synthetic waxes and, with the addition of suitable emulsifying agents, they can be worked up in water into finely dispersed emulsions. Such emulsions produce coatings which are resistant to chemicals; they especially have good alkali-resistance. In their excellent suitability as waxes, the preferred ones are similar to the montanic acid esters.

The metal and ammonium salts, the addition salts of inorganic and organic acids and the quaternary ammonium salts of the compounds of general formula I have similar properties and can be used instead of or together with natural waxes for the above-described purposes.

The production of these salts from the compounds of Formula I is carried out by well-known methods which have been described, for instance, in British Pat. No. 922,830, Swiss Pat. No. 404,335 and Belgian Pat. No. 620,374.

Floor-care agents according to the invention are obtained by mixing a trisamino-s-triazine derivative of the general formula I or several such derivatives with the substances which are suitable for the treatment of floor surfaces, and comprise, as important components, diluting adjuvants compatible with the said triazine derivatives and which are admixed with the latter in sufficient amount for permitting uniform distribution of said agents on surfaces to be treated therewith. Such substances are, for example, (a) body-giving adjuvants such as natural and synthetic waxes, resins, silicones, etc. which improve the physical properties, as well as inorganic and organic fillers, e.g. silicates, milled plastics; (b) solvents; (c) anionic, cationic or nonionic solids-dispersing and emulsifying agents; (d) detergents such as natural and synthetic wetting agents, e.g. soaps; (e) pigments; (f) agents to improve the stability to light; (g) stabilizers of all types such as corrosion inhibitors; and (h) miscellaneous other adjuvants, such as scents, dyestuffs, biocidal active substances or agents containing such substances, e.g. insecticides, fungicides, bactericides, etc.

The content of compounds of Formula I in such agents ranges from 0.2 to about 50% of the total weight of the agent. Preferred compositions according to the invention contain about 1 to 40% of their total weight of a compound of formula Ia.

The compounds of Formula I, and the above-mentioned salts thereof, can be used in these agents instead of natural waxes or together therewith for the treatment and protection of such surfaces as, for example, surfaces of inorganic materials, e.g. metal surfaces such as chromed metal parts, polished stone, ceramic tiles, automobile bodies, but also as gloss-imparting and surface-protecting agents for surfaces of organic materials, e.g. wood, leather, plastic resinous material such as linoleum, etc., on textiles as hydrophilic agents, and on paper as carriers for copying layers. Surfaces treated therewith can be given a high gloss by polishing lightly.

The surface treating agents according to the invention can be in the form of and be used as aerosols, solutions, emulsions, semi-solid and solid pastes. The agents can thus serve especially as floor care compositions which render floors of all kinds of material smooth and glossy, while preferably having an anti-slip effect. Floors to which the agents according to the invention have been applied, show a fine gloss, many of the novel s-triazine derivatives being self-polishing, or the gloss of such treated floors and the like surfaces can be enhanced by subsequent rubbing with a soft cloth or the like well-known techniques. Floor care agents according to the invention can be applied to unsealed as well as to sealed floors.

Such floor-care compositions contain as essential ingredients the above mentioned about 0.2% to 50% by weight of an amine of formula I given hereinbefore, and in preferred compositions from about 1 to 40%, an amine of formula IA as well as an adjuvant compatible with said amine and selected from:
i. a solid macromolecular compound which is film-forming by about 1 to 5% of its weight of a plasticizer, and which has at 20°C a Tukon hardness of at most 10.
ii. a hard resin which has at 20°C for a Tukon hardness above 10, and such component (a) or (b) plasticized with a plasticizer selected from a liquid organic compound which has, at 20°C a viscosity ranging from 52–100.000, a melting point below 15°C, and a solid plasticizer having a penetration index between 1 and 80 at 20°C, and a melting point above 40°C,
iii. a cationic emulsifying agent,
iv. a non-ionic emulsifying agent, and
v. mixtures of at least two of said components (i) through (iv).

These compositions can be diluted with conventional admixtures of solvents and, optionally, also co-solvents.

More in particular, three classes of floor care agents can be produced with guanidino-s-triazines of formula I as a waxy component. These are, firstly, polishing waxes, i.e. agents that are applied with a certain solvent content which evaporates, leaving a coating on the treated surfaces that must subsequently be polished, e.g. with a cloth or a suitable polishing apparatus, and secondly, sealing agents for wooden floors, especially for parquet floors. The content of guanidino-s-triazines of formula I in these classes of agents should be from about 1 to 25% calculated on the weight of the solids content of the agent, the balance of the latter consisting of a hardwax, preferably a paraffin wax or a microwax, e.g. tankbottom wax, isoparaffin, ceresin, ozokerite, wax substitutes or synthetics of the types described below.

As evaporable solvents for the wax and the triazine components petroleum fractions, e.g. white spirits, have been found to be particularly economic. The solvent should be capable of dissolving the solids readily at temperatures of 60° to 80°C.

Synthetic wax substitutes which are particularly suitable for use in the above described classes of floor care agents are
A. solid macromolecular compounds which are film-forming by themselves or by admixture with from about 1 to 5% of a plasticizer, and which have at 20°C a Tukon hardness (ASTM D 1474-62 T) of at most 10 and, when plasticized with dibutyl phthalate in a weight ratio of 3:1, a Sward hardness of at least 2, and preferably between 5 and 40; such compounds pertaining to the following:

A 1

Organic esters of cellulose, obtained by partial esterification of the hydroxyl groups of cellulose by organic monocarboxylic acids or mixtures of such acids, preferably the acetate, acetobutyrate and propionate esters.

The viscosity of these organic esters of cellulose can vary from 0.1 to 200 poises (ASTM D-1343-54 T method, carried out on a solution prepared according to formula A of the ASTM D-871-54 T method), but the esters of viscosity 0.1 to 10 poises are preferred. Preferred cellulose esters are those of alkanoic and alkenoic acids having at most 5 carbon atoms.

A 2

Cellulose nitrates.

A 3

Cellulose ethers (alkylcelluloses and carboxyalkylcelluloses); preferred are those ethers of alkyl and/or hydroxy-alkyl groups having lower molecular weight.

A 4

Polyvinyl ketals, in particular polyvinyl acetals. Their content of

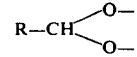

groups can vary from 65 to 85%, but those which contain 72 to 80% are preferred; the content of R-COO groups can vary from about 1 to 2%, but acetals containing about 2% thereof are preferred, the content of free OH groups can vary from 10 to 30%, with the range of 17–22% being preferred. R represents lower alkyl ($C_1$ to $C_4$).

The "Höppler" viscosities of these ketals can be:
2 to 115 centipoises, with the range of 2–5 cP being preferred, for 6% strength solutions in methanol at 20°C,
5 to 125 cP, and preferably 5–10 cP, for 5% strength solutions in 85% strength ethyl alcohol at 25°C, and
10 to 300 cP, and preferably 10–20 cP, for 5% strength solutions in butanol at 20°C.

Other suitable compounds of this class are the polyvinyl butyrals produced by the reaction of butyraldehyde with polyvinyl alcohols, in which the percentage by weight of polyvinyl alcohol groups in the molecule can vary from 10 to 25%, and preferably from 17 to 21%.

The viscosity of a 5% strength solution of polyvinyl butyral in 95% strength ethyl alcohol at 20°C can vary from 5 to 110 centipoises, preferably from 5 to 15 centipoises.

The designation "polyvinyl" is intended to indicate that the product has resulted from the condensation of a vinyl monomer. The polyvinyl chains have a 1,3-glycol structure corresponding to the following formula:

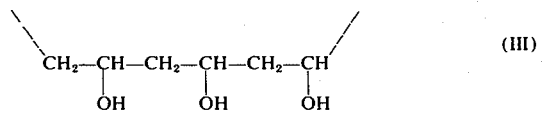

A 5

Phenoplastics, preferably the phenoplastics which have been modified by incorporating higher fatty acids and/or polyesters of dicarboxylic acids, and which have a viscosity which can vary from 8 to 40 poises at 20°C (for a 60% strength solution in butanol, Hoppler method), and preferably a viscosity of between 10 and 15 poises.

A 6

Aminoplastics which have been modified preferably by condensation with polyesters of aliphatic polycarboxylic acids and of polyalcohols, and/or by any other type of internal plsaticisation. The flow time of a 60% strength solution of modified aminoplastic in butanol, at 20°C, in the DIN 4 cup, can vary from 150 to 800 seconds, but modified aminoplastics which under these conditions give flow times of 550 to 650 seconds are preferred.

A 7

Polyurethanes, especially urethane oils obtained by combination of diisocyanates with unsaturated vegetable oils (for example linseed oil), in which the oil content can vary from 55 to 75%; preferably urethane oils in which the oil content is about 65%.

Other wax substitutes suitable for use in the second aforesaid class of floor care agents, i.e. sealing agents, are B. hard resins which are preferably insoluble in hydrocarbon solvents and have at 20°C a Tukon hardness above 10, and, plasticized with dibutyl phthalate in a weight ratio of 3:1, a Sward hardness above 50, and preferably between 50 and 80, said resin being preferably compatible with compound (A), supra, and with constituents (D) and (E), described infra; suitable hard resins being, in particular,

B 1

Resins originating from the condensation of melamine (2,4,5-triamino-triazine) with formaldehyde.

B 2

Resinous condensation products of urea and formaldehyde, so-called urea-formaldehyde resins, preferably in unmodified form.

B 3

Styrene resins, and principally the condensation resins of styrene with an ester of maleic acid and optionally an organic compound possessing at least two hydroxyl groups.

B 4

Solid silicone resins, corresponding to the general three-dimensional structure

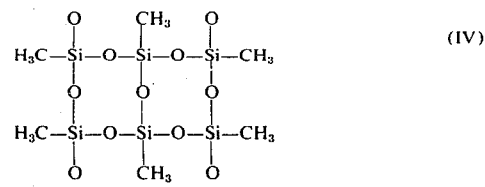

Such synthetic wax substitutes can also be used in the form of mixtures of those types enumerated above under (A) and (B), and they can also be used with an admixture, of up to 40% of the weight of the wax substitute component, of a liquid or solid plasticizer or a mixture of solid and liquid plasticizer as described further below.

A third class of such floor care agents comprises aqueous emulsions as described further above. In these emulsions the content of guanidino-s-triazine according to the invention amounts to about 1 to 35 % of the weight of the non-aqueous portion of the agent, which latter portion consists essentially of the waxy components, namely the guanidino-s-triazine component and a wax, a wax substitute or a hard resin component, and of a suitable emulsifying agent and, preferably, of a plasticizer for the hard resin.

Waxes particularly suitable for this class of floor care agents are emulsifiable waxes such as non-tacky natural waxes, e.g. Carnauba wax, and montanic acid ester waxes.

Wax substitutes and hard resin components falling under the classes of (A) and (B) defined hereinbefore and which are particularly suitable for use in such floor care emulsions containing guanidino-s-triazines are the following:

A 8

Acrylic polymers, preferably polyesters of acrylic and methacrylic acids with lower alkanols.

Poly(isobutyl methacrylates), poly(n-butyl methacrylates) and isobutyl/n-butyl copolymers are preferred.

The Tukon hardness of the acrylic polymers can vary from 1 to 10 and is preferably from 4 to 10.

A 9

Resin acids, and preferably polymers originating from oleo-resins secreted by conifers (molecular weight above 300), such as colophony.

B 5

Aldehyde/ketone resins (for example, Ketone resin A, sold by the German company BADISCHE ANILIN UND SODA FABRIK of Ludwigshafen, or Ketone resin SK, sold by the German company CHEMISCHE WERKE HULS, of Marl, both in Germany).

B 6

Esters of polyacrylic acid and lower alkanols (lower polyacrylic resins).

Polyacrylic resins of which the Tukon hardness is greater than 10, and which are obtained by polymerisation of methyl acrylate, methyl methacrylate, ethyl methacrylate, n-butyl methacrylate or isobutyl methacrylate, or by copolymerisation of n-butyl methacrylate and isobutyl methacrylate, methyl methacrylate and n-butyl methacrylate, methyl methacrylate and isobutyl methacrylate, ethyl methacrylate and n-butyl methacrylate, or ethyl methacrylate and isobutyl methacrylate, will be preferred, though of course this list of preferred polyacrylics is not intended to be limiting.

B 7

Esters of monomeric resin acids, preferably the esters of resin acids from colophony which possess at least one carboxyl group, and of organic compounds possessing at least one hydroxyl group such as, preferably, the lower alkanols and aromatic alcohols such as phenol, and also fumaric acid.

B 8

Esters of organic non-resinous polycarboxylic acids, and of monomeric polyhydric alcohols, such as phthalic resins.

B 9

Products originating from the polycondensation of phenolic compounds with formaldehyde, which are unmodified. Plasticizers that can be used with the wax, wax substitute or resin components of the aforesaid three classes of floor care agents are preferably C. liquid plasticizers which have, at 20°C, a viscosity ranging from 50 to 100,000 centipoises, an acid number of at most 10, a refraction index from 1.350 to 1.550 at 20°C, a melting point below 15°C and a weight loss due to evaporation in 2 hours and at a temperature of 20°C which is below 0.1 gram.

D. solid plasticizers which are compatible or miscible with plasticizer (C) and have a penetration index between 1 and 80 at 20°C, a melting point above 40°C, and a weight loss due to evaporation in 2 hours and at a temperature of 20°C which is below 0.1 gram;

the contents of constituent (D) being at most 20% of the total weight of constituents (A), (B), (C) and (D) taken together.

The liquid plasticizers (C) are preferably chosen from amongst the liquid organic compounds having a viscosity, at 20°C, ranging from 50 to 100,000 centipoises and which is preferably between 200 cP and 30,000 cP, and a melting point below 15°C. Their volatility on being heated at 100°C for 100 hours can be from 1 to 2.5% by weight. Their vapour pressure is preferably less than 0.001 Torr at 20°C.

The liquid plasticizers which conform to the above mentioned conditions are especially chosen from the following groups:

D 1

Esters of resin acids, preferably of the resin acids of colophony, and of aliphatic alcohols containing preferably from one to two hydroxyl groups per molecule and being free from ether groups (C – O – C bridges).

D 2

Esters of resin acids, and preferably of the resin acids of colophony, and of ethers of polyalcohols, having preferably from 2 to 3 hydroxyl groups of which one is etherified by lower alkyl. Preferred are particularly the soft resins obtained from resinic acids and diethylene glycol.

D 3

Esters of monocarboxylic aliphatic non-resinic acids and of aliphatic monomeric alcohols having from 1 to 12 hydroxyl groups. Preferred are the acetobutyrates and acetoisobutyrates of sucrose and the oleates of alkanols having from 8 to 16 carbon atoms.

D 4

Esters of polycarboxylic aliphatic acids and of aliphatic, preferably monohydric alcohols.

D 5

Esters of cyclic polycarboxylic non-resinic acids and of aliphatic, preferably monohydric alcohols, and preferably the phthalates of aliphatic alcohols having at most 20 carbon atoms.

D 6

Esters of cyclic polycarboxylic non-resinic acids and of cyclic hydroxyl compounds, and preferably the phthalates of cycloaliphatic alcohols of 5 to 6 ring carbon atoms and those of phenols.

D 7

Unsaturated fatty alcohols having from 12 to 20 carbon atoms.

D 8

Esters of ortho-phosphoric acid and of aliphatic, cycloaliphatic and aromatic alcohols.

D 9

Polypropylene-glycols of a molecular weight of from about 2,000 to 4,000, the solubility of which in water is less than 0.1 g in 100 g of water at 25°C, for example the polyglycol "P 2000" and the polyglycol "P 4000" sold by DOW CHEMICAL COMPANY of Midland, Michigan, USA.

D 10

Monoglycerides, diglycerides and triglycerides of organic carboxylic non-resinic acids having at least 4 carbon atoms, and preferably of those, which are unsaturated and have from 10 to 20 carbon atoms.

D 11

Non- drying alkyd resins which are unmodified with acids of the fatty series, and are soft and viscous (viscosity: about 50 to 200 cP at 20°C when diluted in a weight ratio of 1:1 with butyl acetate).

D 12

Non- drying alkyd resins modified with saturated or unsaturated fatty acids.

D 13

Liquid chlorinated diphenyls, the chlorine content of which ranges from 41 to 61% by weight.

D 14

Soft polycarbamate resins (for example URESIN B, sold by HOECHST AG, Frankfurt-am-Main, Germany).

D 15

Liquid triazines of the formula

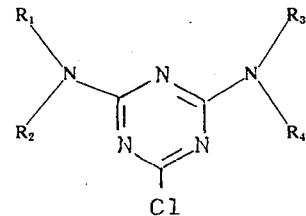

(V)

wherein

Each of $R_1$ and $R_3$, independently of the other, represents a hydrogen atom or a saturated and preferably aliphatic hydrocarbon radical having from one to 18 carbon atoms or a monocyclic aralkyl group in which the alkyl portion has at most 4 carbon atoms, or each of the pairs $R_1/R_2$ and $R_3/R_4$ taken together with the respective nitrogen atom to which it is linked, represents a group selected from pyrrolidino, piperazino, each of $R_1$ and $R_3$ preferably represents a hydrogen atom or an alkyl group of from 1 to 4 carbon atoms while each of $R_2$ and $R_2$ preferably represents an alkyl group of from 1 to 4 carbon atoms.

The solid plasticizers (D) are either crystalline or waxy, and are preferably miscible or compatible with the liquid plasticizer (C) and have a melting point above 40°C and a penetration index between 1 and 80 at 20°C, as determined with a penetrometar, and preferably a penetration number of 4 to 25, their weight loss due to evaporation in 2 hours and at 20°C being less than 0.1 gram. These solid plasticizers are particularly chosen from amongst the products belonging to one of the following classes:

E 1:
Esters of saturated organic monocarboxylic acids having 8 to 11 carbon atoms, and of monohydric alcohols having from 8 to 12 carbon atoms.

E 2:
Esters of aliphatic monocarboxylic non-resinous acids having from 8 to 24, and preferably from 10 to 20 carbon atoms, and monomeric polyhydric alcohols having at least 2 carbon atoms, and preferably from 2 to 12 hydroxyl groups; the alcohol moieties of these esters are preferably aliphatic.

E 3:
Aliphatic saturated monocarboxylic acids having at least 12 and preferably not more than 24 carbon atoms.

E 4:
Aliphatic dicarboxylic acids having from 6 to 12 carbon atoms.

E 5:
Fatty alcohols having from 12 to 22 carbon atoms and especially the fatty alcohols of which the hydrocarbon chain is saturated; within this group, tetradecyl or myristyl alcohols (C 14) and hexadecyl or cetyl alcohols (C 16) are preferred.

E 6:
Amines of the types R-NH$_2$, (VI)

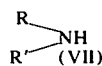

and

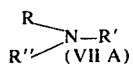

wherein R, R' and R'', which may be identical or different, represent aliphatic hydrocarbon radicals containing from 7 to 24 carbon atoms.

E 7:
Esters of acids of the fatty series with at least 10 carbon atoms, preferably 12 to 24 carbon atoms, and of polyvinyl alcohols; the viscosity of these esters when hot, measured in accordance with the Ubbelohde method, is between about 300 and 500 cSt at 70°C, and between about 100 and 300 cSt at 100°C; these esters must have an acid number less than 1 and a saponification number of zero, and the content of unsaponifiable matter must hence be 100%.

E 8:
Natural and syntheteic lecithins.

E 9:
Polyethyleneglycols resulting from the polycondensation of ethylene oxide, and corresponding to the general formula: $HO - CH_2 - (CH_2 - O - CH_2)_n - CH_2OH$ wherein n is greater than 3 and preferably between 4 and about 700.

E 10:
Monomeric polyhydric alcohols, having an uninterrupted linear or branched aliphatic, or alicyclic-aliphatic, or alicyclic chain, and preferably from 2 to 6 hydroxy groups, which alcohols have a melting point of at least 40°C and preferably above 50°C.

2,2-dihydroxymethyl-butan-1-ol and trimethylolpropane, having a melting point of 58°C are examples of such alcohols.

E 11:
Diesters of carbocyclic dicarboxylic acids having at least 7 carbon atoms and of cyclic or alicyclic-aliphatic monohydric alcohols, of which the melting point is preferably above 50°C. Dicyclohexyl phthalate, having a melting point of 64°C, is an example of these diesters.

E 12:
Diesters of carbocyclic dicarboxylic acids having at least 7 carbon atoms and of monohydric aliphatic alcohols having at least 8 carbon atoms.

Emulsifying agents are used as dispersing and emulsion stabilising components in the floor care agents according to the invention pertaining to the above-mentioned third class. They are used in amounts of from about 0.01 to 5%, but preferably not exceeding about 2% of the non-aqueous portion of the emulsion. This invention is not limited in its broad aspects to any particular emulsifying agent. Such agents are described, for instance in "A list of commercially available detergents, wetting, dispersing and emulsifying agents," by H. L. Cupples. Division of Insecticide Investigations of the U.S. Department of Agriculture, published June 1940, and in chapter 11 on "Emulsions" of Mattiello's "Protective and Decorative Coatings," Vol. IV, John Wiley & Sons, Inc., New York, 1944. Nor is the invention in its broad aspects limited to agents of either the ionic or non-ionic type, though the use of those of the non-ionic type is preferred.

Sulphonated vegetable oils (e.g. sulphonated castor oil, corn oil, peanut oil, soy bean oil etc.) are examples of ionic agents that may be used. When such agents are used, it is advisable to use soft water for dilution purposes.

Emulsifying agents of the non-ionic type are preferred. This type of agent will usually dissolve or suspend from 1 to 50% of its volume or weight of the solid components described thereinbefore, and the emulsion may then be diluted with water to the desired concentration for application to a floor surface.

A class of non-ionic agents that we have found particularly suitable for the purposes of this invention consists of water-soluble, non-ionic emulsifying agents containing polyether groups of the formula $R.O.(C_2H_4O).n.R_1$, wherein R is an alkyl, aryl, aralkyl, alkylaryl or acyl group of 10 to about 20 carbon atoms and $R_1$ is an alkyl, aryl, aralkyl, alkyl-aryl, or acyl group or a hydrogen atom, and n is an integer greater than 2 and preferably from 1 to 30, but may be up to 100.

Commercial products answering to the foregoing description, which have been used in practicing the invention, are those made by Atlas Chemical Industry, Wilmington, Delaware and sold under the trademarks Tween and Atlox and those made by Rohm and Haas Co., Philadelphia, pennsylvania and sold under the name of TRITON X 100. Tween is a polyoxyalkylene derivative of sorbitan monolaurate, and Triton X 100 noctylphenol polyethylene glycol having 9–10 ethylene oxid groups per mole of oxyphenol.

Other non-ionic commercial products are Igepal CA 630, of similar chemical composition, Emullat P 140 which is a mixture of alkylarylpolyglycolether similar to the last mentioned products and alkylarylsulfonate, Genapol 0–100 which is an oleylalcohol polyglycolether of a molar ratio of oleyl alcohol to ethylene oxide of about 1:10, Surfynol 104 which is 3,5dimethyl-1-hexen-3-ol, Tetronic 304 which is a product of the successive addition of propylene oxide and ethylene oxide to one mole of ethylene diamine, which product has a mean molecular weight of about 750, Sapogenat T 100 which is a tributylphenol polyglycol ether having a density of 1.029 g/cm$^3$ and a viscosity at 50°C of 69.9 centipoises, Genapol C-080 which is the polyglycol ether obtained from 8 moles of ethylene oxide per mole of coconut oil fatty alcohol, 3-amino-2-methyl-propanol, and the polyethylene glycols of molecular weight of 1,500 or more, marketed under the trade name Carbowax.

The following non-limitative examples describe the production of the new amines, and the production and composition of surface treating agents according to the invention. Where not otherwise stated, parts and percentages are given therein by weight and the temperatures are in degrees Centigrade.

EXAMPLE 1 a. 246 Parts of [4,6-dichloro-s-triazinyl-(2)]-imidocarbonyl chloride are dissolved in 500 parts by volume of carbon tetrachloride and a solution of 810 parts of n-octadecylamine in 7,500 parts by volume of carbon tetrachloride is added while stirring intensively at 0°–5°. Finally a solution of 175 parts of sodium carbonate in 1,500 parts by volume of water is added dropwise. The reaction mixture is then slowly heated and refluxed for 5 hours. On completion of the reaction, the solvent is distilled off and the residue is stirred with 3,000 parts by volume of acetone. The undissolved part is filtered off, washed thoroughly with water and dried. 2-(1',3'-di-n-octadecylguanidino)-4-n-octadecylamino-6-chloro-s-triazine is obtained which, after recrystallisation from ethyl alcohol, melts at 94° – 96°.

b. 945 Parts of 2-(1',3'-di-n-octadecyl-guanidino)-4-n-octadecylamino-6-chloro-s-triazine and 35 parts of ethylene diamine are dissolved by heating in 4,000 parts by volume of xylene and, while stirring, 45 parts of pulverised sodium hydroxide are added. The reaction mixture is then refluxed while distilling off water. When no more water is separated off, the mixture is refluxed for another 3 hours. It is then filtered hot, the filtrate is evaporated to dryness in vacuo and the residue is stirred with 5,000 parts by volume of acetone. The solid, undissolved part is separated, washed thoroughly with water and dried in vacuo. 2,2'-ethylene-di-imino-bis-[4-(1',3'-di-n-octadecyl-guanidino)-6-n-octadecylamino-s-triazine] is obtained which, after recrystallisation from acetic acid ethyl ester, melts at 82° – 84°.

The following compounds are obtained in the manner described in Example 1 when using triazines of Formula II (2 mols) and a polybasic amine or an at least di-basic nitrogen-containing heterocyclic compound (1 mol):

| Example No: | Compounds | Melting Point |
|---|---|---|
| 2 | 2,2'-ethylene-di-imino-bis-[4-(1'3'-dimethyl-1',3'-di-n-octadecyl-guanidino)-6-methyl-n-octadecylamino-s-triazine]. | 48 – 51° |
| 3 | 2,2'-[methylimino-bis-(trimethylene-imino)]-bis-[4-(1'',3''-di-n-octadecyl-guanidino)-6-n-octadecylamino-s-triazine]. | 94 – 96° |
| 4 | N,N'-bis-[2'-(1'',3''-di-n-octadecyl-guanidino)-4'-n-octadecylamino-s-triazinyl-(6')]-1-amino-3-aminomethyl-3,5,5-trimethylcyclohexane. | 86 – 89° |
| 5 | 2,2'-(piperazine-1,4-diyl)-bis-[4-(1'',3''-di-n-octadecyl-guanidino)-6-n-octadecylamino-s-triazine]. | 58 – 62° |
| 6 | 2,2'-(piperazine-1,4-diyl)-bis-[4-(1'',3''-dimethyl-1'',3''-di-n-octadecyl-guanidino)-6-methyl-n-octadecylamino-s-triazine]. | 40 – 42° |

The compounds of the formula

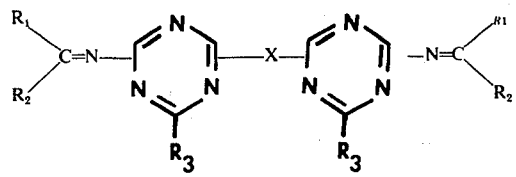

having the respective substituents given in the following Table are obtained in a manner analogous to Example 1.

EXAMPLE 230 a. 4.95 parts of 2,2'-(piperazine-1,4-diyl)-bis-[4-(1'',3''-dimethyl-1'',3''-di-n-octadecylguanidino)-6-methyl-n-octadecylamino-s-triazine], 4.05 parts of petroleum wax (M.P.: 86°–88°; acid No. (A.N.) 13–16; saponification No. (S.N.) 45–55; penetration 4– 6 at 100 g/25°/5 sec.), 0.63 part of the condensation product of oleyl alcohol and ethylene oxide (molar ratio about 1:5), as emulsifier, 0.54 part of olein, 0.54 part of aminomethyl propanol, 77.89 parts of water.

Table

| Example No. | $R_1$ | $R_2$ | $R_3$ | X |
|---|---|---|---|---|
| 7 | $-NH-C_{22}H_{45}$ | $-NH-C_{22}H_{45}$ | $-NH-C_{22}H_{45}$ | $-N\underset{\smile}{\frown}N-$ (piperazine) |
| 8 | $-NH-n-C_{18}H_{37}$ | $-NH-n-C_{18}H_{37}$ | $-NH-n-C_{18}H_{37}$ | $-NH-CH_2-CH_2-NH-$ |
| 9 | " | " | " | $-NH-(CH_2)_3-NH-$ |
| 10 | " | " | " | $-NH-(CH_2)_5-NH-$ |
| 11 | " | " | " | $-NH-(CH_2)_6-NH-$ |
| 12 | " | " | " | $-NH-CH=CH-CH_2-NH-$ |
| 13 | " | " | " | $-NH-CH_2-CH=CH-CH_2-NH-$ |
| 14 | " | " | " | $-NH-(CH_2)_3-CH=CH-NH-$ |
| 15 | $-NH-C_{18}H_{37}$ | $-NH-C_{18}H_{37}$ | $-NH-C_{18}H_{35}$ | $-NH-CH_2-\text{(cyclopentyl)}-NH-$ |
| 16 | $CH_3-N-C_{18}H_{37}$ | $CH_3-N-C_{18}H_{37}$ | $CH_3-N-C_{18}H_{37}$ | $-NH-(CH_2)_2-\text{(cyclohexyl)}-NH-$ |
| 17 | " | " | " | $-NH-(CH_2)_3-\text{(cyclohexyl)}-NH-$ |
| 18 | " | " | " | $-NH-(CH_2)_4-\text{(cyclohexyl)}-NH-$ |
| 19 | " | " | " | $-NH-CH_2-\text{(cyclohexyl)}-NH-$ |
| 20 | " | " | " | $-NH-(CH_2)_2-\text{(cyclohexyl)}-NH-$ |
| 21 | " | " | " | $-NH-(CH_2)_3-\text{(cyclohexyl)}-NH-$ |
| 22 | " | " | " | $-NH-(CH_2)_4-\text{(cyclohexyl)}-NH-$ |
| 23 | " | " | " | $-NH-CH_2-\text{(cycloheptyl)}-NH-$ |
| 24 | $-NH-i-C_3H_7$ | $-NH-i-C_3H_7$ | thiomorpholino | $-NH-(CH_2)_2-\text{(cyclohexyl)}-NH-$ |
| 25 | $-NH-C_{18}H_{37}$ | $-NH-C_{18}H_{37}$ | $-NH-C_{18}H_{37}$ | $-NH-(CH_2)_3-\text{(cycloheptyl)}-NH-$ |
| 26 | $-NH-CH_2-CH=CH_2$ | $-NH-CH_3$ | $-NH-C_{18}H_{37}$ | $-NH-(CH_2)_4-\text{(cycloheptyl)}-NH-$ |
| 27 | $-NH-n-C_{18}H_{37}$ | $-NH-n-C_{18}H_{37}$ | $-N(C_2H_4OH)_2$ | $-NH-CH_2-\text{(cycloheptyl)}-NH-$ |
| 28 | " | " | $-HN(CH_2)_3N(CH_3)_2$ | $-NH-(CH_2)_2-\text{(cyclooctyl)}-NH-$ |
| 29 | " | " | aziridinyl | $-NH-(CH_2)_3-\text{(cyclooctyl)}-NH-$ |
| 30 | " | " | pyrrolidinyl | $-NH-(CH_2)_4-\text{(cyclooctyl)}-NH-$ |
| 31 | " | " | azetidinyl | $-NH-CH_2-\text{(cyclopentyl)}-CH_2-NH-$ |
| 32 | " | " | morpholino | $-NH-(CH_2)_2-\text{(cyclopentyl)}-CH_2-NH-$ |
| 33 | " | " | 4-methylpiperazinyl | $-NH-(CH_3)_2-\text{(cyclopentyl)}-(CH_2)_2-NH-$ |

Table—Continued

| Example No. | R₁ | R₂ | R₃ | X |
|---|---|---|---|---|
| 34 | $-NH-C_{18}H_{37}$ | $-NH-C_{18}H_{37}$ | $[-NH-(CH_2)_3N^+(CH_3)_3]I^-$ | $-NH-(CH_2)_3-$<cyclopentyl>$-CH_2-NH-$ |
| 35 | $CH_3-\underset{\|}{N}-C_{18}H_{37}$ | $CH_3-\underset{\|}{N}-C_{18}H_{37}$ | $-N(C_2H_4OH)_2$ | $-NH-(CH_2)_3-$<cyclopentyl>$-(CH_2)_2-NH-$ |
| 36 | " | " | $-HN(CH_2)_3N(CH_3)_2$ | $-NH-(CH_2)_3-$<cyclopentyl>$-(CH_2)_3-NH-$ |
| 37 | " | " | $-HN(CH_2)_{10}COONa$ | $-NH-(CH_2)_4-$<cyclopentyl>$-CH_2-NH-$ |
| 38 | " | " | $-N\langle\text{pyrrolidinyl}\rangle$ | $-NH-(CH_2)_4-$<cyclopentyl>$-(CH_2)_2-NH-$ |
| 39 | " | " | $-N\langle\text{morpholino}\rangle$ | $-NH-(CH_2)_4-$<cyclopentyl>$-(CH_2)_3-NH-$ |
| 40 | " | " | $-N\langle\text{N-methylpiperazinyl}\rangle-CH_3$ | $-NH-(CH_2)_4-$<cyclopentyl>$-(CH_2)_4-NH-$ |
| 41 | " | " | -cyclo-dodecyl | $-NH-CH_2-$<cyclohexyl>$-CH_2-NH-$ |
| 42 | " | " | $\left[-\underset{C_2H_5}{\overset{CH_3}{N}}\langle\text{piperazinyl}\rangle\right]Br^-$ | $-NH-(CH_2)_2-$<cyclohexyl>$-CH_2-NH-$ |
| 43 | $-NH-i-C_3H_7$ | $-NH-i-C_3H_7$ | $-\underset{CH_3}{\overset{\|}{N}}-n-C_{18}H_{37}$ | $-NH-(CH_2)_2-$<cyclohexyl>$-(CH_2)_2-NH-$ |
| 44 | $-NH-C_{18}H_{37}$ | $-NH-C_{18}H_{37}$ | $-NH-(CH_3)_3$ | $-NH-(CH_2)_3-$<cyclohexyl>$-CH_2-NH-$ |
| 45 | $-NH-CH_2-CH=CH_2$ | $-NH-CH_2-CH=CH_2$ | $-NH-C_{18}H_{37}$ | $-NH-(CH_2)_3-$<cyclohexyl>$-(CH_2)_2-NH-$ |
| 46 | $-NH-n-C_{18}H_{37}$ | $-NH-n-C_{18}H_{37}$ | $-N(C_2H_4OH)_2$ | $-NH-(CH_2)_3-$<cyclohexyl>$-(CH_2)_3-NH-$ |
| 47 | " | " | $-HN(CH_2)_3N(CH_3)_2$ | $-NH-(CH_2)_4-$<cyclohexyl>$-CH_2-NH-$ |
| 48 | " | " | $-N\langle\text{aziridinyl}\rangle$ | $-NH-(CH_2)_4-$<cyclohexyl>$-(CH_2)_2-NH-$ |
| 49 | " | " | $-N\langle\text{pyrrolidinyl}\rangle$ | $-NH-(CH_2)_4-$<cyclohexyl>$-(CH_2)_3-NH-$ |
| 50 | " | " | $-N\langle\text{azetidinyl}\rangle$ | $-NH-(CH_2)_4-$<cyclohexyl>$-(CH_2)_4-NH-$ |
| 51 | " | " | $-N\langle\text{morpholino}\rangle$ | $-NH-CH_2-$<cyclohexyl>$-CH_2-NH-$ |
| 52 | " | " | $-N\langle\text{N-methylpiperazinyl}\rangle-CH_3$ | $-NH-(CH_2)_2-$<cyclohexyl>$-CH_2-NH-$ |
| 53 | $-NH-C_{18}H_{37}$ | $-NH-C_{18}H_{37}$ | $[-NH-(CH_2)_3N^+(CH_3)_3]I^-$ | $-NH-(CH_2)_2-$<cyclohexyl>$-(CH_2)_2-NH-$ |
| 54 | $CH_3-\underset{\|}{N}-C_{18}H_{37}$ | $CH_3-\underset{\|}{N}-C_{18}H_{37}$ | $-N(C_2H_4OH)_2$ | $-NH-(CH_2)_3-$<cyclohexyl>$-CH_2-NH-$ |
| 55 | " | " | $-HN(CH_2)_3N(CH_3)_2$ | $-NH-(CH_2)_3-$<cyclohexyl>$-(CH_2)_2-NH-$ |
| 56 | " | " | $-HN(CH_2)_{10}COONa$ | $-NH-(CH_2)_4-$<cyclohexyl>$-CH_2-NH-$ |
| 57 | " | " | $-N\langle\text{pyrrolidinyl}\rangle$ | $-NH-CH_2-$<cyclooctyl>$-CH_2-NH-$ |
| 58 | " | " | $-N\langle\text{morpholino}\rangle$ | $-NH-(CH_2)_2-$<cyclooctyl>$-CH_2-NH-$ |
| 59 | " | " | $-N\langle\text{N-methylpiperazinyl}\rangle-CH_3$ | $-NH-(CH_2)_2-cyclo\text{-}octyl-(CH_2)_2-NH-$ |

Table — Continued

| Example No. | R₁ | R₂ | R₃ | X |
|---|---|---|---|---|
| 60 | " | " | -cyclo-dodecyl | $-NH-(CH_2)_3-cyclo-octyl-CH_2-NH-$ |
| 61 | " | " | piperazinium-N,N'-dimethyl-N'-ethyl Br⁻ | $-NH-CH_2-N(CH_3)-CH_2-NH-$ |
| 62 | $-NH-i-C_3H_7$ | $-NH-i-C_3H_7$ | $-N(CH_3)-n-C_{18}H_{37}$ | $-NH-(CH_2-N(CH_3)-)_2-CH_2-NH-$ |
| 63 | $-NH-C_{18}H_{37}$ | $-NH-C_{18}H_{37}$ | $-NH-(CH_2)_3-morpholino$ | $-NH-(C_2H_4-N(CH_3)-)_3-CH_2-NH-$ |
| 64 | $-NH-C_{18}H_{37}$ | $-NH-C_{18}H_{37}$ | $-NH-C_{18}H_{37}$ | $-NH-(C_2H_4-N(C_2H_5)-)_3-CH_2-NH-$ |
| 65 | $-NH-C_{22}H_{45}$ | $-NH-C_{22}H_{45}$ | $-NH-C_{22}H_{45}$ | $-NH-(C_3H_6-N(CH_3)-)_2-C_3H_6-NH-$ |
| 66 | $-N(C_4H_9)-C_{12}H_{25}$ | $-N(C_4H_9)-C_{12}H_{25}$ | $-N(C_4H_9)-C_{12}H_{25}$ | $-NH-(C_4H_8-N(C_2H_5)-)_2-C_4H_8-NH-$ |
| 67 | " | " | " | $-NH-(C_3H_6-N(C_2H_5)-)_3-C_3H_6-NH-$ |
| 68 | $-NH-C_{18}H_{35}$ | $-NH-C_{18}H_{35}$ | $-N(CH_3)-C_{12}H_{25}$ | $-NH-(C_2H_4-N(C_4H_9)-)_2-C_2H_4-NH-$ |
| 69 | $-NH-C_{18}H_{36}(OH)$ | $-NH-C_{18}H_{36}(OH)$ | -piperidino | $-NH-(C_2H_4-N(CH_3)-)_4-C_2H_4-NH-$ |
| 70 | $-N(CH_3)-C_{16}H_{33}$ | $-N(CH_3)-C_{16}H_{33}$ | $-NH-C_{18}H_{35}(Cl_2)$ | $-NH-(C_3H_6-N(CH_3)-)_4-C_3H_6-NH-$ |
| 71 | $-NH-C_{12}H_{25}$ | $-NH-C_{12}H_{25}$ | $-N(CH_3)-C_6H_{13}$ | $-NH-C_6H_4-NH-$ |
| 72 | $-NH-C_6H_{13}$ | $-NH-C_6H_{13}$ | $-NH-C_{18}H_{36}F$ | $-N(CH_3)-C_6H_4-N(CH_3)-$ |
| 73 | $-N(C_6H_{13})-C_{12}H_{25}$ | $-N(C_6H_{13})-C_{12}H_{25}$ | $-NH-C_{18}H_{37}$ | $-N(C_2H_5)-C_6H_4-NH-$ |
| 74 | $-NH-C_{12}H_{25}$ | $-NH-C_{12}H_{25}$ | $-NH-(CH_2)_2N(C_2H_5)_2$ | $-N(CH_3)-C_6H_4-CH_2-NH-$ |
| 75 | $-NH-CH_2-CH=CH_2$ | $-NH-CH_2-CH=CH_2$ | $-NH-C_{12}H_{25}$ | $-NH-C_6H_4-(CH_2)_2-NH-$ |
| 76 | $-NH-C_5H_{11}$ | $-NH-C_5H_{11}$ | $-NH-C_{18}H_{37}$ | $-N(CH_3)-C_6H_4-(CH_2)_3-NH-$ |
| 77 | $-NH-C_{12}H_{25}$ | $-NH-C_{12}H_{25}$ | -morpholino | $-N(C_2H_5)-C_6H_4-(CH_2)_3-N(CH_3)-$ |
| 78 | $-N(CH_3)-C_6H_{13}$ | $-N(CH_3)-C_6H_{13}$ | $-N(CH_3)-C_{18}H_{37}$ | $-N(CH_3)-C_6H_4-(CH_2)_3-N(C_3H_7)-$ |
| 79 | $-NH-C_{22}H_{45}$ | $-NH-C_{22}H_{45}$ | -N-methylpiperazino | $-NH-CH_2-C_6H_4-CH_2-NH-$ |
| 80 | $-N(C_4H_9)-C_{12}H_{25}$ | $-N(C_4H_9)-C_{12}H_{25}$ | $-NH(CH_2)_3OH$ | $-NH-(CH_2)_2-C_6H_4-CH_2-NH-$ |
| 81 | " | " | $-NH-bicyclo[3.2.1]octyl$ | $-NH-(CH_2)_2-C_6H_4-(CH_2)_2-NH-$ |

Table — Continued

| Example No. | R₁ | R₂ | R₃ | X |
|---|---|---|---|---|
| 82 | $-NH-C_{18}H_{35}$ | $-NH-C_{18}H_{35}$ | $-N\langle\text{azepane}\rangle$ | $-NH-(CH_2)_3-\text{C}_6\text{H}_4-CH_2-NH-$ |
| 83 | $-NH-C_{18}H_{36}(OH)$ | $-NH-C_{18}H_{36}(OH)$ | $-NH-\langle\text{cyclohexyl-H}\rangle$ | $-NH-(CH_2)_4-\text{C}_6\text{H}_4-CH_2-NH-$ |
| 84 | $-N(CH_3)-C_{16}H_{33}$ | $-N(CH_3)-C_{16}H_{33}$ | $-NH-C_{18}H_{35}(Cl_2)$ | $-NH-(CH_2)_3-\text{C}_6\text{H}_4-(CH_2)_3-NH-$ |
| 85 | $-NH-C_{12}H_{25}$ | $-NH-C_{12}H_{25}$ | $-N\langle\text{piperidine}\rangle$ | $-N(CH_3)-CH_2-\text{C}_6\text{H}_4-CH_2-N(CH_3)-$ |
| 86 | $-NH-C_6H_{13}$ | $-NH-C_6H_{13}$ | $-NH-C_{18}H_{36}F$ | $-N(C_2H_5)-CH_2-\text{C}_6\text{H}_4-CH_2-N(C_2H_5)-$ |
| 87 | $-N(C_6H_{13})-C_{12}H_{25}$ | $-N(C_6H_{13})-C_{12}H_{25}$ | $-NH-(CH_2)_5COOK$ | $-N(CH_3)-(CH_2)_2-\text{C}_6\text{H}_4-CH_2-NH-$ |
| 88 | $-NH-C_{12}H_{25}$ | $-NH-C_{12}H_{25}$ | $-NH-(CH_2)_2N(C_2H_5)_2$ | $-N(CH_3)-(CH_2)_3-\text{C}_6\text{H}_4-CH_2-N(CH_3)-$ |
| 89 | $-NH-CH_2-CH=CH_2$ | $-NH-CH_2-CH=CH_2$ | $-NH(CH_2)_3-[N-(CH_2)_3]_2-N(CH_3)_2$ | $-N(C_3H_7)-(CH_2)_2-\text{C}_6\text{H}_4-(CH_2)_2-NH-$ |
| 89a | $-NH-C_5H_{11}$ | $-NH-C_5H_{11}$ | $-N\langle\text{morpholine}\rangle \cdot HCl$ | $-N(C_4H_9)-(CH_2)_4-\text{C}_6\text{H}_4-(CH_2)-N(C_4H_9)-$ |
| 90 | $-NH-C_{12}H_{25}$ | $-NH-C_{12}H_{25}$ | $-NH-(CH_2)_5CONH-C_4H_9$ | $-N(CH_3)-(CH_2)_4-\text{C}_6\text{H}_4-(CH_2)_2-N(CH_3)-$ |
| 91 | $-N(CH_3)-C_6H_{13}$ | $-N(CH_3)-C_6H_{13}$ | $-NH\text{ adamantyl}$ | $-N\langle\text{piperazine}\rangle-$ |
| 92 | $-NH-C_{22}H_{45}$ | $-NH-C_{22}H_{45}$ | $-N\langle\text{N-methylpiperazine}\rangle-CH_3$ | $-N\langle\text{piperazine-CH}_3\rangle-$ |
| 93 | $-N(C_4H_9)-C_{12}H_{25}$ | $-N(C_4H_9)-C_{12}H_{25}$ | $-NH(CH_2)_3OH$ | $-N\langle\text{piperazine-C}_2\text{H}_5\rangle-$ |
| 94 | " | " | $-NH-\text{bicyclo}[3.2.1]\text{octyl}$ | $-N\langle\text{piperazine-C}_4\text{H}_9\rangle-$ |
| 95 | $-N(CH_3)-C_{12}H_{25}$ | $-N(CH_3)-C_{12}H_{25}$ | $-N\langle\text{piperidine}\rangle$ | $-N\langle\text{piperazine}\rangle-$ |
| 96 | $-N\langle\text{piperidine}\rangle$ | $-N\langle\text{piperidine}\rangle$ | $-NH-\langle\text{cyclohexyl-H}\rangle$ | $-N\langle\text{piperazine-CH}_3\rangle-$ |
| 97 | $-NH-C_{18}H_{35}(Cl_2)$ | $-NH-C_{18}H_{35}(Cl_2)$ | $-NH-C_{18}H_{35}(Cl_2)$ | $-N\langle\text{piperazine-C}_2\text{H}_5\rangle-$ |
| 98 | $-N(CH_3)-C_6H_{13}$ | $-N(CH_3)-C_6H_{13}$ | $-N\langle\text{piperidine}\rangle$ | $-N\langle\text{2,5-dimethylpiperazine}\rangle-$ |
| 99 | $-NH-C_{18}H_{36}F$ | $-NH-C_{18}H_{36}F$ | $-NH-C_{18}H_{36}F$ | $-N\langle\text{piperazine}\rangle-(CH_2)_2-NH-$ |

3,912,518

Table — Continued

| Example No. | R₁ | R₂ | R₃ | X |
|---|---|---|---|---|
| 100 | $-NH-C_{18}H_{37}$ | $-NH-C_{18}H_{37}$ | $-NH-(CH_2)_5COOK$ | $-N-(CH_2)_2-\text{N}\bigcirc\text{N}-(CH_2)_2-NH-$ |
| 101 | $-NH-(CH_2)_2N(C_2H_5)_2$ | $-NH-(CH_2)_2N(C_2H_5)_2$ | $-\text{N}\bigcirc\text{S}$ | $-NH-NH-_2)_3-\text{N}\bigcirc\text{N}-$ |
| 102 | $-NH-C_{12}H_{25}$ | $-NH-C_{12}H_{25}$ | $-NH(CH_2)_3-[N-(CH_2)_3]_2-N(CH_3)_2$ | $-NH-(CH_2)_3-\text{N}\bigcirc\text{N}-(CH_2)_3-NH-$ |
| 103 | $-NH-C_{18}H_{37}$ | $-NH-C_{18}H_{37}$ | $-[\text{N}\bigcirc\text{O}]\cdot HCl$ | $-\underset{CH_3}{N}-(CH_2)_2-\text{N}\bigcirc\text{N}-$ |
| 104 | $-\text{N}\bigcirc\text{O}$ | $-\text{N}\bigcirc\text{O}$ | $-NH-(CH_2)_5CONH-C_4H_9$ | $-\underset{C_2H_5}{N}-(CH_2)_3-\text{N}\bigcirc\text{N}-CH_2-NH-$ |
| 105 | $-\underset{CH_3}{N}-C_{18}H_{37}$ | $-\underset{CH_3}{N}-C_{18}H_{37}$ | $-NH$ adamantyl | $-\underset{C_2H_5}{N}-(CH_2)_2-\text{N}\bigcirc\text{N}-(CH_2)_2-\underset{C_2H_5}{N}-$ |
| 106 | $-N(CH_3)_2$ | $-N(CH_3)_2$ | $-NH-C_{12}H_{25}$ | $-\text{N}\bigcirc_{CH_3}$ |
| 107 | $-NH-CH-CH_2$ | $-NH-CH-CH_2$ | $-\underset{CH_3}{N}-C_{18}H_{37}$ | $-\text{N}\bigcirc_{C_2H_5}$ |
| 108 | $-NH-i-C_3H_7$ | $-NH-i-C_3H_7$ | $-NH-C_{10}H_{21}$ | -hexahydro-diazapino- |
| 109 | $-N(C_2H_4OH)_2$ | $-N(C_2H_4OH)_2$ | $-NH-C_{16}H_{33}$ | $-NH-(CH_2)_2-$hexahydro-diazapino$-(CH_2)_2-NH-$ |
| 110 | $-\underset{CH_3}{N}-C_{18}H_{37}$ | $-\underset{CH_3}{N}-C_{18}H_{37}$ | $-NH-C_{12}H_{25}$ | $-\underset{CH_3}{N}-(CH_2)_2-$hexahydro-diazapino$-(CH_2)_2-\underset{CH_3}{N}-$ |
| 111 | ,, | ,, | ,, | $-\underset{C_2H_5}{N}-(CH_2)_2-$hexahydro-diazapino$-(CH_2)_2-\underset{C_2H_5}{N}-$ |
| 112 | $-NH-(CH_2)_5CON(CH_3)_2$ | $-NH-(CH_2)_5CON(CH_3)_2$ | $-\text{N}\bigcirc\text{O}$ | $-\text{N}\square-CH_2-NH-$ |
| 113 | $-NH-C_4H_9$ | $-NH-C_4H_9$ | $-NH-C_{12}H_{25}$ | $-\text{N}\square-(CH_2)_3-NH-$ |
| 114 | $-NH-C_{12}H_{25}$ | $-NH-C_{12}H_{25}$ | $-\underset{CH_3}{N}-C_{18}H_{37}$ | $-\text{N}\square-(CH_2)_2-\underset{C_2H_5}{NH-}$ |
| 115 | $-NH-CH_2-CH_2-CH_2Br$ | $-NH-CH_2CH_2-CH_2Br$ | $-\underset{CH_3}{N}-C_{18}H_{37}$ | $-\text{N}\square-(CH_2)_3-\underset{CH_3}{N}-NH-$ |
| 116 | $-NH-CH_2-CH_2-CH_2Cl$ | $-NH-CH_2-CH_2-CH_2Cl$ | ,, | $-\text{N}\bigcirc-NH-$ |
| 117 | $-NH-C_{18}H_{37}$ | $-NH-C_{18}H_{37}$ | $-NH-C_{18}H_{37}$ | $-\text{N}\bigcirc-CH_2-NH-$ |
| 118 | $-\text{N}\bigcirc$ | $-\text{N}\bigcirc$ | $-NH-C_6H_{13}$ | $-\text{N}\bigcirc-(CH_2)_2-NH-$ |
| 119 | $-\text{N}\triangleleft$ | $-\text{N}\triangleleft$ | $-NH-C_{10}H_{21}$ | $-\text{N}\bigcirc-(CH_2)_3-\underset{CH_3}{N}-$ |
| 120 | $-\text{N}\bigcirc$ | $-\text{N}\bigcirc$ | $-NH-C_{12}H_{25}$ | $-\text{N}\bigcirc-(CH_2)_2-\underset{C_2H_5}{N}-$ |
| 121 | $-\text{N}\bigcirc\text{O}$ | $-\text{N}\bigcirc\text{O}$ | $-NH-C_{18}H_{37}$ | $-\text{N}\bigcirc-(CH_2)_3-\underset{C_4H_9}{N}-$ |

Table—Continued

| Example No. | R₁ | R₂ | R₃ | X |
|---|---|---|---|---|
| 122 | $-N(CH_3)_2$ | $-N(CH_3)_2$ | $-NH-C_{12}H_{25}$ | $-NH-CH_2-CH_2-NH-$ |
| 123 | $-NH-CH-CH_2$ | $-NH-C_{12}H_{25}$ | -N⟨ (aziridinyl) | $-NH-(CH_2)_3-NH-$ |
| 124 | $-NH-i-C_3H_7$ | $-N(C_2H_5)_2$ | $-N(C_2H_5)_2$ | $-NH-(CH_2)_5-NH-$ |
| 125 | $-N(C_2H_4OH)_2$ | $-N(C_2H_4OH)_2$ | $-NH-C_{16}H_{33}$ | $-NH-CH=CH-CH_2-NH-$ |
| 126 | $-N(C_{18}H_{37})(CH_3)$ | $-N(C_{18}H_{37})(CH_3)$ | $-NH-CH_2-COONa$ | $-NH-(CH_2)_3-CH=CH-NH-$ |
| 127 | " | " | $-NH(CH_2)_2-[N(CH_2)_2\|CH_3]_3 N(C_2H_5)_2$ | $-NH-CH_2-\text{(cyclopentyl)}-NH-$ |
| 128 | $-NH-(CH_2)_5CON(CH_3)_2$ | $-NH-(CH_2)_5CON(CH_3)_2$ | $-NH-C_{18}H_{37}$ | $-NH-(CH_2)_2-\text{(cyclopentyl)}-NH-$ |
| 129 | $-NH-C_4H_9$ | $-NH-C_{22}H_{45}$ | $-NH-CH_2-CH=CH-COOK$ | $-NH-(CH_2)_3-\text{(cyclopentyl)}-NH-$ |
| 130 | $-NH-C_{12}H_{25}$ | $-NH-C_{12}H_{25}$ | $-NH-C_{17}H_{33}-COONa$ | $-NH-(CH_2)_4-\text{(cyclopentyl)}-NH-$ |
| 131 | $-NH-CH_2-CH_2-CH_2Br$ | $-NH-CH_2-CH_2-CH_2Br$ | -N(piperidinyl) | $-NH-CH_2-\text{(cyclohexyl)}-NH-$ |
| 132 | $-NH-CH_2-CH_2-CH_2Cl$ | $-NH-CH_2-CH_2-CH_2Cl$ | -N(piperidinyl) | $-NH-(CH_2)_2-\text{(cyclohexyl)}-NH-$ |
| 133 | $-NH-C_{18}H_{37}$ | $-NH-C_{18}H_{37}$ | $[-NH(CH_2)_2-CH(CH_3)-(CH_2)_2-{}^+N(CH_3)_3]Cl^-$ | $-NH-(CH_2)_4-\text{(cyclohexyl)}-NH-$ |
| 134 | -N(azepanyl) | -N(azepanyl) | $-NH-C_{22}H_{45}$ | $-NH-CH_2-\text{(cyclohexyl)}-NH-$ |
| 135 | -N⟨ (aziridinyl) | -N⟨ (aziridinyl) | $-NH-C_{18}H_{37}$ | $-NH-(CH_2)_2-\text{(cyclohexyl)}-NH-$ |
| 136 | -N(piperidinyl) | -N(piperidinyl) | $-NH-C_{10}H_{25}$ | $-NH-(CH_2)_3-\text{(cyclohexyl)}-NH-$ |
| 137 | -N(morpholinyl) | -N(morpholinyl) | $-NH-C_6H_{13}$ | $-NH-(CH_2)_4-\text{(cyclohexyl)}-NH-$ |
| 138 | -N(N-methylpiperazinyl) | -N(N-methylpiperazinyl) | $-NH-C_{22}H_{45}$ | (hexahydrodiazepino with CH₃) |
| 139 | $-NH-\text{(cyclohexyl)}$ | $-NH-\text{(cyclohexyl)}$ | $-N(CH_3)-C_5H_{13}$ | (hexahydrodiazepino with CH₃, C₂H₅) |
| 140 | -N(azepanyl) | -N(azepanyl) | $-N(CH_3)-C_{10}H_{21}$ | -hexahydro-diazapino- |
| 141 | $[-N(N^+(CH_3)_2)\text{piperazinium}]$ | $[-N(N^+(CH_3)_2)\text{piperazinium}]$ | $-NH-C_{18}H_{37}$ | $-NH-(CH_2)_2-\text{hexahydro-diazapino}-(CH_2)_2-H-$ |
| 142 | $-N(C_2H_5)_2$ (with C₂H₅⁻) | $-N(CH_3)_2$ | $-NH-C_{18}H_{37}$ | $-N(CH_3)-(CH_2)_2-\text{hexahydro-diazapino}-(CH_2)_2-N(CH_3)-$ |
| 143 | -N(N-methylpiperazinyl) | -N(N-methylpiperazinyl) | $-N(CH_3)-C_{18}H_{37}$ | $-N(C_2H_5)-(CH_2)_2-\text{hexahydro-diazapino}-(CH_2)_2-N(C_2H_5)-$ |
| 144 | $-NH-\text{(cyclohexyl)}$ | $-NH-\text{(cyclohexyl)}$ | $-NH-C_{18}H_{37}$ | -N(pyrrolidinyl)-CH₂-NH- |

Table – Continued

| Example No. | R₁ | R₂ | R₃ | X |
|---|---|---|---|---|
| 145 | -N(azepane) | -N(azepane) | $-NH-C_{12}H_{25}$ | piperidine-$(CH_2)_3-NH-$ |
| 146 | $[-N^+(piperazine)(CH_3)_2]$ | $[-N^+(piperazine)(CH_3)_2]$ | $-NH-C_{18}H_{37}$ | pyrrolidine with $CH_3$, $(CH_2)_2-NH-$ |
| 147 | $-N(C_2H_5)_2$ | $-N(CH_3)_2$ | $-NH-C_{18}H_{37}$ | pyrrolidine with $C_2H_5$, $(CH_2)_3-N(CH_3)-NH-$ |
| 148 | $-NH-C_{22}H_{45}$ | $-NH-C_{22}H_{45}$ | $-N(C_{18}H_{37})(CH_3)$ | piperidine-$NH-$ |
| 149 | $-N(C_6H_{13})(CH_3)$ | $-N(C_6H_{13})(CH_3)$ | $-NH-C_{18}H_{37}$ | piperidine-$CH_2-NH-$ |
| 150 | $-N(C_{10}H_{21})(CH_3)$ | $-N(C_{10}H_{21})(CH_3)$ | $-NH-C_{12}H_{25}$ | piperidine-$(CH_2)_2-NH-$ |
| 151 | $-NH-C_{18}H_{37}$ | $-NH-C_{18}H_{37}$ | $-NH-C_{18}H_{37}$ | piperidine-$(CH_2)_3-N(CH_3)-$ |
| 152 | $-NH-C_{18}H_{37}$ | $-NH-C_{18}H_{37}$ | $-NH-C_{18}H_{37}$ | piperidine-$(CH_2)_2-N(C_2H_5)-$ |
| 153 | $-NH-C_{12}H_{25}$ | $-NH-C_{12}H_{25}$ | $-NH-C_{12}H_{25}$ | piperazine with $CH_3$ |
| 154 | $-N(C_{16}H_{37})(CH_3)$ | $-N(C_{18}H_{37})(CH_3)$ | $-N$(aziridine) | piperazine with $C_2H_5$ |
| 155 | $-NH-C_{10}H_{21}$ | $-NH-C_{10}H_{21}$ | $-N(C_2H_5)_2$ | piperazine with $C_4H_9$ |
| 156 | $-NH-C_{16}H_{33}$ | $-NH-C_{16}H_{33}$ | $-NH-C_{16}H_{33}$ | piperazine- |
| 157 | $-NH-C_{12}H_{25}$ | $-NH-C_{12}H_{25}$ | $-NH-CH_2-COONa$ | piperazine with $CH_3$ |
| 158 | " | " | $-NH(CH_2)_2-[N(CH_2)_2(CH_3)]_3-N(C_2H_5)_2$ | piperazine with $C_2H_5$ |
| 159 | -N(morpholine) | -N(morpholine) | $-NH-C_{18}H_{37}$ | piperazine with two $CH_3$ |
| 160 | $-NH-C_{12}H_{25}$ | $-NH-C_{12}H_{25}$ | $-NH=CH_2-CH=CH-COOK$ | piperazine-$(CH_2)_2-NH-$ |
| 161 | $-N(C_{18}H_{37})(CH_3)$ | $-N(C_{18}H_{37})(CH_3)$ | $-NH-C_{17}H_{33}-COONa$ | $-NH-(CH_2)_2-$piperazine$-(CH_3)_2-NH-$ |
| 162 | $-N(C_{18}H_{37})(CH_3)$ | $-N(C_{18}H_{37})(CH_3)$ | -N(piperidine) | $-NH-(CH_2)_3-$piperazine$-$ |
| 163 | " | " | -N(piperidine) | $-NH-(CH_2)_3-$piperazine$-(CH_2)_3-NH-$ |

Table – Continued

| Example No. | R₁ | R₂ | R₃ | X |
|---|---|---|---|---|
| 164 | $-NH-C_{18}H_{37}$ | $-NH-C_{18}H_{37}$ | $[-NH(CH_2)_2\overset{CH_3}{\underset{}{N}}-(CH_2)_2-{}^+N(CH_3)_3]CH^-$ | $-N(CH_3)-(CH_2)_2-$piperazinyl$-N(CH_3)-$ |
| 165 | $-NH-C_6H_{13}$ | $-NH-C_6H_{13}$ | $-NH-C_{22}H_{45}$ | $-N(C_2H_5)-(CH_2)_3-$piperazinyl$-CH_2-NH-$ |
| 166 | $-NH-C_{10}H_{21}$ | $-NH-C_{10}H_{21}$ | $-NH-C_{18}H_{37}$ | $-N(C_2H_5)-(CH_2)_2-$piperazinyl$-(CH_2)_2-N(C_2H_5)-$ |
| 167 | $-NH-C_{12}H_{25}$ | $-NH-C_{12}H_{25}$ | $-NH-C_{10}H_{25}$ | (3-methylpiperidinyl)$-(CH_2)_3-N(C_4H_9)-$ |
| 168 | $-NH-C_{18}H_{37}$ | $-NH-C_{18}H_{37}$ | $-NH-C_6H_{13}$ | $-NH-(CH_2)_3-$cyclohexyl$-NH-$ |
| 169 | $-$(4-methylpiperazinyl) | $-$(4-methylpiperazinyl) | $-NH-C_{22}H_{45}$ | $-NH-CH_2-$phenyl$-CH_2-NH-$ |
| 170 | $-NH-$cyclohexyl | $-NH-$cyclohexyl | $-N(C_6H_{13})(CH_3)$ | $-NH-(CH_2)_2-$phenyl$-CH_2-NH-$ |
| 171 | $-$(azepan-1-yl) | $-$(azepan-1-yl) | $-N(C_{10}H_{21})(CH_3)$ | $-NH-(CH_2)_2-$phenyl$-(CH_2)_2-NH-$ |
| 172 | $[-$(1,1-dimethylpiperazinium)$]^+ I^-$ | $[-$(1,1-dimethylpiperazinium)$]^+ I^-$ | $-NH-C_{18}H_{37}$ | $-NH-(CH_2)_3-$phenyl$-CH_2-NH-$ |
| 173 | $-N(C_2H_5)_2$ | $-N(CH_3)_2$ | $-NH-C_{18}H_{37}$ | $-NH-(CH_2)_4-$phenyl$-CH_2-NH-$ |
| 174 | $-NH-C_{22}H_{45}$ | $-N(C_{18}H_{37})(CH_3)$ | $-$(4-methylpiperazinyl) | $-NH-(CH_2)_3-$phenyl$-(CH_2)_3-NH-$ |
| 175 | $-N(C_6H_{13})(CH_3)$ | $-NH-C_{18}H_{37}$ | $-NH-$cyclohexyl | $-N(CH_3)-CH_2-$phenyl$-CH_2-N(CH_3)-$ |
| 176 | $-N(C_{10}H_{21})(CH_3)$ | $-NH-C_{12}H_{25}$ | $-$piperidinyl | $-N(C_2H_5)-CH_2-$phenyl$-CH_2-N(C_2H_5)-$ |
| 177 | $-NH-C_{18}H_{37}$ | $-NH-C_{18}H_{37}$ | $[-$(1,1-dimethylpiperazinium)$]^+$ | $-N(CH_3)-(CH_2)_2-$phenyl$-CH_2-NH-$ |
| 178 | $-NH-C_{18}H_{37}$ | $-NH-C_{18}H_{37}$ | $-N(C_2H_5)_2$ | $-N(CH_3)-(CH_2)_3-$phenyl$-CH_2-N(CH_3)-$ |
| 179 | $-$(4-methylpiperazinyl) | $-$(4-methylpiperazinyl) | $-$(4-methylpiperazinyl) | $-N(C_3H_7)-(CH_2)_2-$pyridyl$-(CH_2)_2-NH-$ |
| 180 | $-NH-$cyclohexyl | $-NH-$cyclohexyl | $-NH-$cyclohexyl | $-N(C_4H_9)-(CH_2)_4-$phenyl$-(CH_2)_4-N(C_4H_9)-$ |
| 181 | $-$piperidinyl | $[-$(1,1-dimethylpiperazinium)$]^+ I^-$ | $-$piperidinyl $[-$(1,1-dimethylpiperazinium)$]^+ I^-$ | $-N(CH_3)-(CH_2)_4-$phenyl$-(CH_2)_2-N(CH_3)-$, triazabicyclo- |

Table - Continued

| Example No. | R₁ | R₂ | R₃ | X |
|---|---|---|---|---|
| 182 | $-N\begin{smallmatrix}C_2H_5\\C_2H_5\end{smallmatrix}$ | $-NH-C_{22}H_{45}$ | $-N\begin{smallmatrix}CH_3\\CH_3\end{smallmatrix}$ | $-NH-CH_2-CH=CH-CH_2-NH-$ |
| 183 | $-NH-n-C_{18}H_{37}$ | $-N(C_2H_4CH)_2$ | $-NH-n-C_{18}H_{37}$ | $-NH-(C_3H_6-N)_2-C_3H_6-NH-$ <br> $\quad\quad\quad\quad\quad\quad CH_3$ |
| 184 | '' | $-HN(CH_2)_3N(CH_3)_2$ | '' | $-NH-(C_4H_8-N)_2-C_4H_8-NH-$ <br> $\quad\quad\quad\quad\quad\quad C_2H_5$ |
| 185 | '' | -N▷ (aziridine) | '' | $-NH-(C_3H_6-N-)_3-C_3H_6-NH-$ |
| 186 | '' | -N (pyrrolidine) | '' | $-NH-(C_2H_4-N)_2-C_2H_4-NH-$ <br> $\quad\quad\quad\quad\quad\quad C_4H_9$ |
| 187 | '' | -N (azetidine) | '' | $-NH-(C_3H_4-N-)_4-C_2H_4-NH-$ <br> $\quad\quad\quad\quad\quad\quad CH_3$ |
| 188 | '' | -N O (morpholine) | '' | $-NH-(C_3H_6-N-)_4-C_3H_6-NH-$ <br> $\quad\quad\quad\quad\quad\quad CH_3$ |
| 189 | '' | -N N-CH₃ (N-methylpiperazine) | '' | $-NH-\text{C}_6\text{H}_4-NH-$ |
| 190 | $-NH-C_{18}H_{37}$ | $[-NH-(CH_2)_3^+N(CH_3)_3]I^-$ | $-NH-C_{18}H_{37}$ | $-N(CH_3)-\text{C}_6\text{H}_4-N(CH_3)-$ |
| 191 | $CH_3-N-C_{18}H_{37}$ | $-N(C_2H_4CH)_2$ | $CH_3-N-C_{18}H_{37}$ | $-N(C_2H_5)-\text{C}_6\text{H}_4-NH-$ |
| 192 | '' | $-HN(CH_2)_3N(CH_3)_2$ | '' | $-N(CH_3)-\text{C}_6\text{H}_4-CH_2-NH-$ |
| 193 | '' | $-HN(CH_2)_{10}COONa$ | '' | $-NH-\text{C}_6\text{H}_4-(CH_2)_2-NH-$ |
| 194 | '' | -N (pyrrolidine) | '' | $-N(CH_3)-\text{C}_6\text{H}_4-(CH_2)_3-NH-$ |
| 195 | '' | -N O (morpholine) | '' | $-N(C_2H_5)-\text{C}_6\text{H}_4-(CH_2)_2-N(CH_3)-$ |
| 196 | '' | N-CH₃ | '' | $-N(CH_3)-\text{C}_6\text{H}_4-(CH_2)_3-N(C_3H_7)-$ |
| 197 | $-NH-C_{22}H_{45}$ | -N N-CH₃ | $-NH-C_{22}H_{45}$ | $-NH-(CH_2)_3-\text{C}_6H_{10}-(CH_2)_3-NH-$ |
| 198 | $-N\begin{smallmatrix}-C_{12}H_{25}\\C_4H_9\end{smallmatrix}$ | $-NH(CH_2)_3CH$ | $-N\begin{smallmatrix}-C_{12}H_{25}\\C_4H_9\end{smallmatrix}$ | $-NH-(CH_2)-\text{C}_6H_{10}-CH_2-NH-$ |
| 199 | '' | -NH-bicyclo[3.2.1]octyl | '' | $-NH-(CH_2)_1-\text{C}_6H_{10}-(CH_2)_2-NH-$ |
| 200 | $-N\begin{smallmatrix}-C_{12}H_{25}\\CH_3\end{smallmatrix}$ | -N (piperidine) | $-NH-C_{18}H_{35}$ | $-NH-(CH_2)_1-\text{C}_6H_{10}-(CH_2)_3-NH-$ |
| 201 | -N (piperidine) | -NH-C₆H₁₁ | $-NH-C_{18}H_{36}(OH)$ | $-NH-CH_2-\text{C}_6H_{10}-CH_2-NH-$ |
| 202 | $-NH-C_{18}H_{35}(Cl_2)$ | $-NH-C_{18}H_{35}(Cl_2)$ | $-N\begin{smallmatrix}-C_{16}H_{33}\\CH_3\end{smallmatrix}$ | $-NH-(CH_2)_2-\text{C}_6H_{10}-CH_2-NH-$ |
| 203 | $-N\begin{smallmatrix}-C_6H_{13}\\CH_3\end{smallmatrix}$ | -N (piperidine) | $-NH-C_{12}H_{25}$ | $-NH-(CH_2)_3-\text{C}_6H_{10}-CH_2-NH-$ |
| 204 | $-NH-C_{18}H_{36}F$ | $-NH-C_{19}H_{35}F$ | $-NH-C_6H_{13}$ | $-NH-(CH_2)_3-\text{C}_6H_{10}-CH_2)_2-NH-$ |

Table – Continued

| Example No. | R₁ | R₂ | R₃ | X |
|---|---|---|---|---|
| 205 | $-NH-C_{18}H_{37}$ | $-NH-(CH_2)_5COOK$ | $-N(C_{12}H_{25})(C_6H_{13})$ | $-NH-CH_2-\text{cyclooctyl}-CH_2-NH-$ |
| 206 | $-NH-(CH_2)_2N(C_2H_5)_2$ | $-NH-(CH_2)_2N(C_2H_5)_2$ | $-NH-C_{12}H_{25}$ | $-NH-(CH_2)_2-\text{cyclooctyl}-CH_2-NH-$ |
| 207 | $-NH-C_{12}H_{25}$ | $-NH(CH_2)_3[N-(CH_2)_3]_2-N(CH_3)_2$ | $-NH-CH_2-CH=CH_2$ | $-NH-(CH_2)_2-\text{cyclo-octyl}-(CH_2)_2-NH-$ |
| 208 | $-NH-C_{18}H_{37}$ | $[-\text{morpholino}]\cdot HCl$ | $-NH-C_5H_{11}$ | $-NH-CH_2-N(CH_3)-CH_2-NH-$ |
| 209 | $-\text{morpholino}$ | $-NH-(CH_2)_5CONH-C_4H_9$ | $-NH-C_{12}H_{25}$ | $-NH-(CH_2-N(CH_3)-)_2-CH_2-NH-$ |
| 210 | $-N(CH_3)(C_{18}H_{37})$ | $-NH\text{ adamantyl}$ | $-N(CH_3)(C_6H_{13})$ | $-NH-(C_2H_4-N(CH_3)-)_3-CH_2-NH-$ |
| 211 | $-NH-i-C_3H_7$ | $-N(CH_3)(n-C_{18}H_{37})$ | $-NH-i-C_3H_7$ | $-NH-(C_2H_4-N(C_2H_5)-)_3-CH_2-NH-$ |
| 212 | $-NH-C_{16}H_{37}$ | $-NH-(CH_3)_3-\text{morpholino}$ | $-NH-C_{18}H_{37}$ | $-NH-(CH_2)_4-\text{cyclohexyl}-(CH_2)_3-NH-$ |
| 213 | $-NH-C_{12}H_{25}$ | $-NH-C_{12}H_{25}$ | $-N(CH_3)_2$ | $-NH-CH_2-\text{cyclooctyl}-NH-$ |
| 214 | $-N(CH_3)(C_{18}H_{37})$ | $-N\text{(aziridinyl)}$ | $-NH-CH=CH_2$ | $-NH-(CH_2)_3-\text{cyclooctyl}-NH-$ |
| 215 | $-NH-C_{10}H_{21}$ | $-N(C_2H_5)_2$ | $-NH-i-C_3H_7$ | $-NH-(CH_2)_4-\text{cyclooctyl}-NH-$ |
| 216 | $-NH-C_{16}H_{33}$ | $-NH-C_{16}H_{33}$ | $-N(C_2H_4OH)_2$ | $-NH-CH_2-\text{cyclopentyl}-CH_2-NH-$ |
| 217 | $-NH-C_{12}H_{25}$ | $-NH-CH_2-COONa$ | $-N(CH_3)(C_{18}H_{37})$ | $-NH-(CH_2)_2-\text{cyclopentyl}-CH_2-NH-$ |
| 218 | " | $-NH(CH_2)_2-[N(CH_2)_2(CH_3)]_3N(C_2H_5)_2$ | " | $-NH-(CH_2)_3-\text{cyclopentyl}-CH_2-NH-$ |
| 219 | $-\text{morpholino}$ | $-NH-C_{18}H_{37}$ | $-NH-(CH_2)_5CON(CH_3)_2$ | $-NH-(CH_2)_3-\text{cyclopentyl}-(CH_2)_2-NH-$ |
| 220 | $-NH-C_{12}H_{25}$ | $-NH-CH_2-CH=CH-COOK$ | $-NH-C_4H_9$ | $-NH-(CH_2)_3-\text{cyclopentyl}-(CH_2)_3-NH-$ |
| 221 | $-N(CH_3)(C_{18}H_{37})$ | $-NH-C_{17}H_{33}-COONa$ | $-NH-C_{12}H_{25}$ | $-NH-(CH_2)_4-\text{cyclopentyl}-CH_2-NH-$ |
| 222 | $-N(CH_3)(C_{18}H_{37})$ | $-N\text{(piperidino)}$ | $-NH-CH_2-CH_2-CH_2Br$ | $-NH-(CH_2)_4-\text{cyclopentyl}-(CH_2)_2-NH-$ |
| 223 | " | $-N\text{(piperidino)}$ | $-NH-CH_2-CH_2-CH_2CH$ | $-NH-(CH_2)_4-\text{cyclopentyl}-(CH_2)_4-NH-$ |
| 224 | $-NH-C_{18}H_{37}$ | $[-NH(CH_2)_2N(CH_3)-(CH_2)_2-{}^+N(CH_3)_3]Cl^-$ | $-NH-C_{18}H_{37}$ | $-NH-CH_2-\text{cyclohexyl}-CH_2-NH-$ |
| 225 | $-NH-C_6H_{13}$ | $-NH-C_{22}H_{45}$ | $-N\text{(pyrrolidino)}$ | $-NH-(CH_2)_2-\text{cyclohexyl}-CH_2-NH-$ |

Table — Continued

| Example No. | R₁ | R₂ | R₃ | X |
|---|---|---|---|---|
| 226 | —NH—C$_{10}$H$_{21}$ | —NH—C$_{18}$H$_{37}$ | -N◁ | —NH—(CH$_2$)$_2$—⟨cyclohexyl⟩—(CH$_2$)$_2$—NH— |
| 227 | —NH—C$_{12}$H$_{25}$ | —NH—C$_{10}$H$_{25}$ | -N◁ | —NH—(CH$_2$)$_3$—⟨cyclohexyl⟩—CH$_2$—NH— |
| 228 | —NH—C$_{18}$H$_{37}$ | —NH—C$_6$H$_{13}$ | | —NH—(CH$_2$)$_3$—⟨cyclohexyl⟩—(CH$_2$)$_2$—NH— |
| 229 | —NH—C$_{18}$H$_{37}$ | —NH—C$_{18}$H$_{37}$ | —NH—CH$_2$—CH—CH$_2$ | —NH—(CH$_2$)$_4$—⟨cyclopentyl⟩—(CH$_2$)$_3$—NH— | b. 1.20 parts of colophonium-modified phenolic resin having a melting point of about 152°, the phenolic resin base of which is produced as described in Example 2 of U.S. Pat. No. 2,532,374, 0.40 part of concentrated ammonia, 8.40 parts of water.

c. 0.02 part of trimethyl-(γ-perfluoro-octylamido-propylene)-ammonium iodide as wetting agent, 0.40 part of tris-(butoxyethyl)-phosphate, 0.98 part of water.

The components of the mixture a), with the exception of the water, are melted at 150°, the homogeneous melt is cooled to 100°–110° and, while stirring vigorously, it is slowly added to the amount mentioned of boiling water. The emulsion formed is cooled to room temperature and the mixtures b) and c) are added one after the other while stirring.

The resultant emulsion wax is excellently suited for the care of modern floorings. On polyvinyl chloride tiles, a polishing value of 30.0 is obtained therewith whilst an emulsion produced according to the present example in which the wax according to the invention is replaced by carnauba wax, only attains a polishing value of 17.0. In addition, floorings treated with the wax emulsion produced according to the above example are considerably less slippery than those which have been treated with carnauba wax.

EXAMPLE 231 a. 4.250 parts of 2,2'-ethylene-di-imino-bis-[4-(1',3'-dimethyl-1',3'-di-n-octadecyl-guanidino)-6-methyl-n-octadecylamino-s-triazine], 4.250 parts of montanic acid ester wax (M.P.: 80°–83°; A.N.: 20–30; S.N.: 135–150), 4.250 parts of petroleum wax (M.P.: 86°–88°; A.N.: 13–16; S.N.: 45–55; penetration: 4–6 at 100g/25°/5 sec.), 0.850 part of olein, 0.765 part of the same emulsifier as used in Example 230, 0.680 part of aminomethyl propanol, 69.955 parts of water, b. 2.250 parts of the same colophonium-modified phenolic resin as used in Example 230, 0.675 part of concentrated ammonia, 12.075 parts of water.

The components of the mixture a), with the exception of the water, are melted at 150°, the homogeneous melt is cooled to 100°–110° and, while stirring, is slowly added to the amount mentioned of boiling water. The emulsion formed is cooled to room temperature and the mixture b) is added while stirring.

The resultant emulsion wax is excellently suited for the care of modern floorings, a self-shine which can afterwards be polished being attained. If the coating obtained on polyvinyl chloride tiles is washed with a moist cloth, the polishing value increased from 45.0 to 53.0 whereas the polishing value of an emulsion produced according to the above example in which the wax according to the invention is replaced by carnauba wax only increased on washing from 45.0 to 46.0.

EXAMPLE 232

A liquid floor-care composition is prepared by mixing 0.25 part of 1,3-bis[2'-(1'',3''-di-N-methyl-n-docosyl-guanidino)-4'-N-methyl-n-docosyl-amino-s-triazine-(6'-yl)]-1-amino-3-aminomethyl-3,5,5-trimethyl-cyclohexane (M.P.: 53° – 54°), 0.75 part of vinyl octadecyl ether polymer (M.P.: 49°), 1.50 parts of microwax (M.P.: 74° – 76°; penetration ASTM 30), 7.50 parts of paraffin (M.P.: 50° –52°), 5.00 parts of 1,4-dioxane, 80.00 parts of petroleum fraction (boiling range: 150° – 180°).

The components are dissolved at 120° and the clear solution is quickly cooled while stirring whereupon a homogeneous, gel-like liquid is formed. This can be used as liquid floor-care polish and gives high gloss.

The antislip effect of this floor-care composition was tested in comparison with the anti-slip effect of a standard floor-care wax composition containing instead of 5.25 % of triazine wax, 2.25 % of partially saponified montanic acid ester wax having a melting point of 92° – 97°, an acid number of 20 – 25 and a saponification number of 110 – 125, and 3.00 % of montanic acid ester wax having a melting point of 72° – 77° and an acid number of 6 – 10.

Antislip friction was measured with the aid of a measuring body having a surface covered with a filter paper and with a dyanmometer (0 – 30 g). The piece of linoleum treated with the standard wax composition shows an average antislip friction of 14 g, whereas the triazine wax composition shows an average antislip friction of 18 g.

EXAMPLE 233

Floor-care composition 40 parts of 2,2'-(piperazine-1,4-diyl)-bis-[4-(1'',3''-dimethyl-1'',3''-dimethyl-1'',3''-di-n-octadecyl-guanidino)-6-methyl-n-octadecylamino-s-triazine] were slowly dissolved at a temperature of about 60° in 60 parts of Shell Sol T, a solvent consisting of aliphatic hydrocarbon and having a boiling range of 184° – 207°. A solution was thus obtained which was further diluted to a 10 % solution in the same solvent.

The antislip effect of this floor-care composition was tested on a piece of wooden floor previously treated with the same standard floor wax composition as that described hereinbefore, and then polished 20 times with a soft cloth after two hours wait. This piece of wooden floor was then treated with the above guanidine-triazine wax composition and again polished 20 times with a soft cloth after two hours wait. Antislip friction of the polished pieces of wood before and after application of the guanidine triazine was then measured with the aid of a measuring body having a surface covered with filter paper and with a dynamometer (0 – 30 g). An average increase of antislip friction of 20 % was shown by the piece of wooden floor which had been aftertreated with the guanidino-triazine solution over that of the piece of floor treated only with the standard floor-wax composition.

In Example 230, 231 and 232, the petroleum wax component can be replaced by:

| | |
|---|---|
| cellulose acetobutyrate | (a) |
| cellulose acetoisobutyrate | (a') |
| polyvinyl acetal | (b) |
| cellulose dinitrate | |
| hydroxypropyl cellulose | (c) |
| ethyl cellulose | (d) |
| polyvinyl butyral | (e) |
| modified phenoplastic resin | (f) |
| modified aminoplastic resin | (g) (g') |
| polyurethane containing 65% safflower oil | (h) |
| polyurethane containing 65% of linseed oil | (h') |
| melamine resin | (i) |
| unmodified urea-formaldehyde resin | (j) |
| styrene/maleic anhydride copolymer | (k) |
| silicone resin | (l) | and the montanic ester wax or the petroleum wax component can be replaced by:

| | |
|---|---|
| poly-(methyl methacrylate) | (m) |
| poly-(isobutyl methacrylate) | (n) |
| poly-(propyl methacrylate) | (o) |
| Colophony Grade WW | |
| cyclohexanone/formaldehyde resin | (p) |
| phenol-terpene resin | (q) |
| poly-(butyl methacrylate) | (r) (s) |
| phthalic resin | (t) |
| phenol resin | (u) |
| phenol-formaldehyde resin, unmodified | (v) |

Plasticizers that may be added to the above wax substitutes, are, for example:

Liquid plasticizers:
D-1 Methyl abietate
D-2 Colophonium diethylene glycol soft resins (w) (x)
D-3 sucrose acetobutyrate (y)
   sucrose acetoisobutyrate (z)
D-4 dioctyl sebacate decyl oleate
D-5 didecyl phthalate
D-6 dimethylcyclohexyl phthalate
D-7 cis-9-octadecen-1-ol
D-8 trioctyl phosphate
D-9 polypropylene glycol (aa)
D-10 glycerol monooleate, glycerol dioleate, refined castor oil
D-11 non-drying unmodified alkyd resin (ab)
D-12 non-drying alkyd resin (ac)
   alkyd resins modified (ad) (ae)
D-13 chlorinated diphenyl 48% Cl
D-14 carbamic soft resin (af)
D-15 2-chloro-4,6-bis-(diethylamino)-s-triazine.

Solid plasticizers:
E-1 octyl laurate
E-2 hydrogenated castor oil M.P. 85.5°C
   refined copra M.P. 26°C
E-3 fully hydrogenated copra
   lauric acid
   fatty acids
E-4 adipic acid
E-5 hexyl-dodecanol, octyldodecanol, lauryl alcohol cetyl alcohol, myristyl alcohol
E-6 monostearyl amine
E-7 polyvinyl stearate (ag)
E-8 lecithine
E-9 polyethylene (Mol.w. ca. 1500)
E-10 2,2,4-trimethylpentane-1,3-diol
   2,2-dihydroxymethyl-butan-1-ol
E-11 dicyclohexyl phthalate
E-12 ditetradecyl phthalate
   butyrate of 1,4-butanediol
   glycerol monolaurate Details Concerning the Substances Employed in the Preceding Examples a. cellulose acetobutyrate
having a repetitive unit of the formula

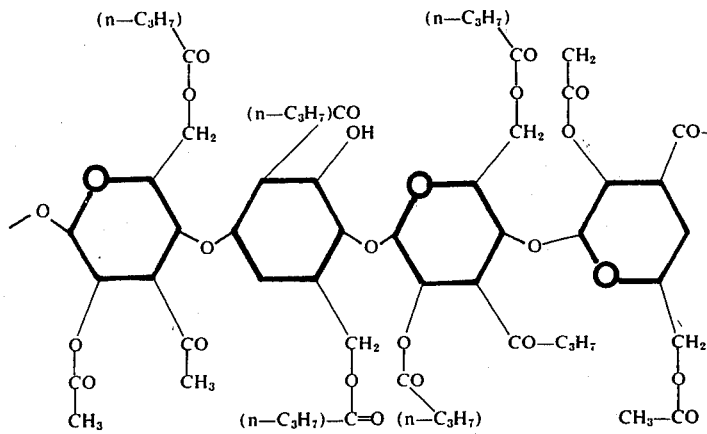
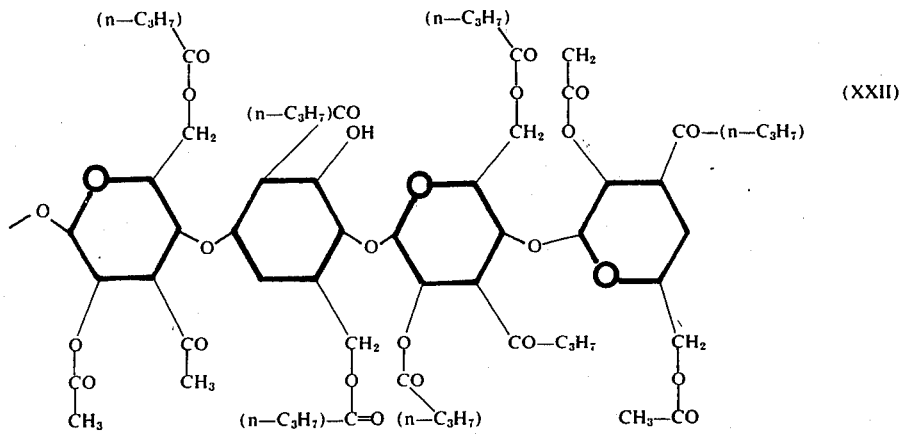

(XXII)

and which is soluble in ethanol and has a viscosity of 0.3 seconds measured according to ASTMD 1343-54 T with a solution according to D 871 54 T.

a'. cellulose acetoisobutyrate having a repetitive unit of a formula similar to formula XXII, but in which the groups —O—CO—CH—CH$_2$—CH$_3$ are replaced by the groups

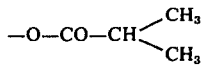

b. polyvinyl acetal melting point: 100° ± 5°C (determined according to KramerSarnow)

viscosity: 40 ± 2 centipoises (determined with a 20% solution, calculated on the total weight of the latter, in a mixture of ethanol and ethyl acetate in a weight ratio of 85:15 as solvent).

c. hydroxypropyl cellulose

An aqueous solution having a concentration of 5% by weight and having a viscosity at 25°C of 25 to 150 centipoises (measured according to Brookfield).

d. ethyl cellulose

Viscosity of 8 to 11 centipoises in a 5% by weight solution of a toluene/ethanol mixture in a weight ratio of 80 : 20 at 25°C.

e. polyvinyl butyral

Viscosity at 20°C in a 5% ethanol solution (prepared at 95°c) 10 centipoises acidity, calculated as acetic acid less than 0,05%
content of polyvinyl alcohol about 20%
content of polyvinyl acetate about 3% f. modified phenoplastic resin
melting range 55° to 60°C
acid number 80 to 95
soluble in alcohols, glycol ethers, ketones and esters, slightly soluble in aliphatic hydrocarbons.

g. modified aminoplastic resin
type: modified urea-formaldehyde resin
coloration index 2 (DIN 53,403)
acid number 6 maximum (DIN 53,402)
viscosity (Hoppler viscosity at 20°C)
in a 60% isobutanol solution : 8 to 10 poises.

g'. modified aminoplastic resin
type: modified melamine-formaldehyde resin
coloration index 0 to 1
acid number about 0.5
viscosity in a 55% isobutanol solution: about 200 seconds (cup DIN 4 at 20°C)
soluble in any proportion in the following solvents: ethanol, isopropanol, butanol, ethylene glycol.

h. polyurethane containing 65% of safflower oil
acid number less than 0.5
hydroxyl number maximum 6
not containing any free isocyanate groups
viscosity at 20°C about 5,000 centipoises
density at 20°C 0.930 h'. polyurethane containing 65% of linseed oil
acid number 0.5
hydroxyl number 6 mg KOH per gram
not containing any free isocyanate groups.

i. melamine resin:
malamine/formaldehyde condensation product
melting point 62.5°C
Sward hardness 58
The product is soluble at a rate of 25% by weight in ethanol.

j. unmodified urea-formaldehyde resin
acid number 1
viscosity in a 60% isobutanol solution (cup DIN 4, at 20°C) about 500 seconds k. styrene/maleic anhydride copolymer
molecular weight about 1,900
melting range 135° to 150°C
acid number 220
viscosity in a 10% acetone solution at 30°C 0,76 centistoke l. silicone resin
melting point 88°C
soluble in isopropanol
silicone/ethylene glycol copolymer m. poly-(methyl-methacrylate)
density 1.09 at 25°C
viscosity temperature 63° ± 2°C
acid number about 7 n. poly-(isobutyl-methacrylate)
Tukon hardness about 8
specific weight 1.10 at 20°C
viscosity at 20°C in a 40% solution of:
  benzene 2.000 cps
  toluene 570 cps
  xylene 975 cps
  methyl isobutyl ketone 1425 cps.

o. poly-(propyl-methacrylate)
Tukon hardness 7 to 8
density 1.07 at 25°C
viscidity temperature 40° ± 2°C
acid number less than 10
viscosity in a 40% isopropanol solution 8,000 centipoises.

p. cyclohexanone/formaldehyde resin (ketonic resin)
acid number less than 1
softening range 105°–115°C q. phenol-terpene resin
melting range 117°–130°C
acid number 60–70
viscosity 20–30 centipoises in a 50% by weight toluene solution at 20°C.

r. poly-(butyl-methacrylate)
Tukon hardness about 12
viscidity temperature 77°C,
copolymer of methacrylic acid with butanol and isobutanol.

s. poly-(butyl-methacrylate)
Tukon hardness 12
specific weight at 25°C 1.11
viscidity temperature 57°C ± 2°C
Brookfield viscosity at 25°C in a 40% isopropanol solution 2,400 centipoises t. phthalic resin, pure
melting point 98°C
acid number 180 to 200 u. pure phenol resin
melting range 75° to 83°C (capillary method)
acid number 0
soluble in any proportion in alcohols and glycol ethers.

v. unmodified phenol-formaldehyde resin
melting point 79°C (capillary method)
acid number 0
soluble in any proportion in alcohols and glycol ethers, insoluble in aliphatic and aromatic hydrocarbons.

w. rosin/diethylene glycol soft resin
acid number less than 10 saponification number about 15
iodine number 140
refractive index 1.525 ($n_D^{20°}$)
Höppler viscosity at 20°C about 200 poises specific weight at 20°C. 1.07 to 1.08 g/cm³ x. soft resin from natural resinic acids condensed with diethylene glycol
acid number 2 to 3
coloration index in a 50% acetone solution 1 to 2
density 1.06 to 1.07 g/ml at 20°C
hydroxyl number 120 to 145 y. sucrose acetobutyrate of the formula

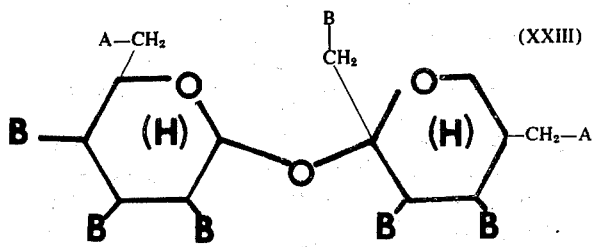

wherein A represents the group —O—CO—CH₃,
B represents the group —O—CO—(CH₂)—CH₃ and
(H) represents a saturated ring.

z. sucrose acetoisobutyrate of the Formula XXIII wherein
A has the same meaning and B represents the group

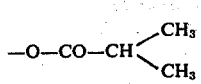

aa) polyglycol P 2000
molecular weight about 2000
density 1.002 at 20°C
refractive index 1.450 at 25°C
pour point 0°C; flash point 445°F; fire point 510°F
viscosity 1880 centistokes at 0°C.

ab. unmodified non-drying alkyd resin
acid number <20
viscosity in a 50% butyl acetate solution about 25 seconds (about 100 cp) (cup DIN 4°-20°C)
soluble in any proportion in glycol ethers ac. non-drying modified alkyd resin containing 33% of phthalic anhydride and 42% of coconut oil.

ad. non-drying alkyld resin modified by fatty acids containing 31% of phthalic anhydride and 23% of fatty acids, having an acid number of 12 – 18 and a hydroxyl number of about 140.

ae. non-drying alkyl resin modified by ricinus oil
content of phthalic anhydride 32%
content of oil 54%
acid number < 20
viscosity in a 50% xylene solution (cup DIN 4°-20°C) 130 to 170 seconds = 550 to 770 centipoises,
soluble in any proportion in glycol ethers and alcohols, insoluble in aliphatic hydrocarbons.

af. carbamic soft resin
density at 20°C 1.1
flash point 180°-200°C (with decomposition)
viscosity (at 20°C) 130 poises ag. polyvinyl stearate
melting point 48°-50°C
penetration index 1 to 2
density 0.93 to 0.94 at 20°C
viscosity 400 centistokes at 70°C and 200 centistokes at 100°C (according to

| | |
|---|---|
| acid number | less than 1 |
| saponification number | 0 |
| ash | 0 |
| non-saponifiable | 100% |

We claim:
1. A floor-care composition containing as essential ingredients from about 0,2 % - 50 % by weight of a compound which is of the formula

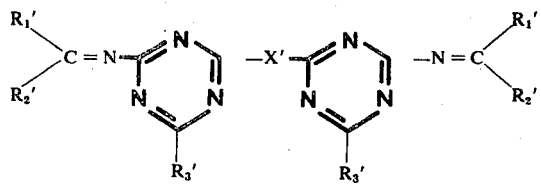

wherein X' represents one of the following divalent bridging members:
a. — NR — Y — NR —
wherein
Y represents alkylene of from 2 to 6 carbon atoms; alkenylene of from 3 to 6 carbon atoms; cycloalkylene-alkylene wherein the cycloalkylene moiety has from 5 to 8 and the alkylene moiety from 1 to 4 carbon atoms; alkylene-cycloalkylene-alkylene wherein the cycloalkylene moiety has from 5 to 8 carbon atoms and each alkylene moiety has from 1 to 4 carbon atoms, the total number of carbon atoms of the entire bridge member not exceeding 12;
b. — NR — (alkylene-NR)ₐalkylene-NR—
wherein
each "alkylene" has from 2 to 6 carbon atoms, and $n$ represents an integer ranging from 0 to 4;
c. — NR — phenylene — NR —
d. — NR — phenylene — alkylene — NR —
wherein
the alkylene moiety has at most 4 carbon atoms;
e. — NR — alkylene — phenylene — alkylene — NR—
wherein
each alkylene moiety has at most 4 carbon atoms;
R in each of the foregoing bridging members representing hydrogen or alkyl of at most 4 carbon atoms; or
f. a divalent heterocyclic radical of the formula

which consists, apart from the two nitrogen atoms, of from 3 to 5 methylene groups as ring members, said methylene groups being unsubstituted or substituted by alkyl of at most 4 carbon atoms;
g. a divalent heterocyclic radical of the formula —NR—alkylene—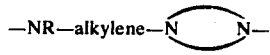

which consists, apart from the two nitrogen atoms, of from 3 to 5 methylene groups as ring members, said methylene groups being unsubstituted or substituted by alkyl of at most 4 carbon atoms;
h. a divalent heterocyclic radical of the formula
— NR — alkylene —NR—alkylene—N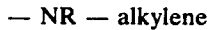N—alkylene—NH—

— alkylene — NR —
which consists, apart from the two nitrogen atoms, of from 3 to 5 methylene groups as ring members, said methylene groups being unsubstituted or substituted by alkyl of at most 4 carbon atoms; or
i. a divalent heterocyclic radical of the formula

which consists, apart from the nitrogen atom, and the group R-C-,
of from 3 to 5 methylene groups as ring members, said methylene groups being unsubstituted or substituted by alkyl of at most 4 carbon atoms, and
R having the same meaning as above; any substituent of the aforesaid cycloalkylene, aromatic and heterocyclic moieties and bridge members being an alkyl group of at most 4 carbon atoms; and
each of $R_1'$, $R_2'$ and $R_3'$ represents a mono- or disubstituted amino group, the substitution of which is selected from alkyl of from 1 – 22 carbon atoms, and alkenyl of from 1 –22 carbon atoms, at least one of the aforesaid amino substituents in $R_1'$, $R_2'$ or $R_3'$ being alkyl or alkenyl having from 6 – 22 carbon atoms; pyrrolidino; piperidino; piperazino; 4-lower alkyl-piperazino; morpholino; thiomorpholino; hexahydroazepino or hexahydrodiazepino, and an addition salt of said compound with an acid or with a quaternizing agent, and diluting adjuvant compatible with said compound, in sufficient amount for permitting uniform distribution of said agent on surfaces to be treated herewith, selected from
  i. a solid macromolecular compound which is film-forming by about 1 to 5% of its weight of a plasticizer, and which has a 20°C a Tukon hardness of at most 10,
  ii. a hard resin which has at 20°C a Tukon hardness above 10, and such component (a) or (b) plasticized with a plasticizer selected from from a liquid organic compound which has, at 20°C a viscosity ranging from 52–100,000, a melting point below 15°C, and a solid plasticizer having a penetration index between 1 and 80 at 20°C, and a melting point above 40°C,
  iii. a cationic emulsifying agent,
  iv. a non-ionic emulsifying agent, and
  V. mixtures of at least two of said components (i) through (iv).

2. A floor-care composition as defined in claim 1, wherein said triazine derivative is 2,2'-(piperazine-1,4-diyl)-bis-[4-(1'',3''-dimethyl-1'', 3''-di-n-octadecylguanidino)-6 -methyl-n-octadecylamino-s-triazine].

3. A floor-care composition as defined in claim 1, wherein said triazine derivative is 2,2'-ethylene-diimino-bis -[4-(1',3'-dimethyl-1',3'-di-n-octadecylguanidino)-6-methyl-n-octadecylamino-s-triazine].

4. A floor care composition as defined in claim 1 wherein said triazine derivative is 2,2'-ethylene-di-imino-bis-[4-(1', 3'-di-methyl-1', 3'-di-n-octadecyl-guanidino)-6-methyl-n-octadecylamino-s-triazine].

5. A floor care composition as defined in claim 1 wherein said triazine derivative is 2,2'-[methylimino-bis-(trimethyleneimino)]-bis [4-(1'',3''-di-n-octadecyl-guanidino)-6-n-octadecylamino-s-triazine].

6. A floor care composition as defined in claim 1 wherein said triazine derivative is N,N'-bis-[2'-(1'', 3''-di-n-octadecyl-guanidino)-4'-n-octadecylamino-2-triazinyl-(6)]-1 -amino-3-amino- methyl-3,5,5-trimethylcyclohexane.

7. A floor care composition as defined in claim 1 wherein said triazine derivative is 2,2'-(piperazine-1,4-diyl)-bis-[4-1'', 3'', -di-n-octadecylguanidino)-6-n-octadecylamino-s-triazine].

* * * * *